United States Patent
Morimoto

(10) Patent No.: US 8,532,434 B2
(45) Date of Patent: Sep. 10, 2013

(54) IMAGE PROCESSING METHOD AND APPARATUS FOR DETERMINING ORIENTATIONS BASED ON RELIABILITIES OF A PLURALITY OF PORTIONS INTO WHICH IMAGE HAS BEEN DIVIDED OR FOR DETERMINING ORIENTATIONS OF PORTIONS OF IMAGE DIVIDED BY USER'S INPUT SO AS TO RECOGNIZE CHARACTERS FOR EACH DIVIDED PORTION OF IMAGE, IMAGE FORMING APPARATUS, AND STORAGE MEDIUM

(75) Inventor: Atsuhisa Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 564 days.

(21) Appl. No.: 12/814,144

(22) Filed: Jun. 11, 2010

(65) Prior Publication Data

US 2010/0316295 A1 Dec. 16, 2010

(30) Foreign Application Priority Data

Jun. 15, 2009 (JP) ................................. 2009-142552

(51) Int. Cl.
- G06K 9/36 (2006.01)
- G06K 9/32 (2006.01)
- G09G 5/00 (2006.01)
- H04N 9/74 (2006.01)
- G01C 17/00 (2006.01)

(52) U.S. Cl.
USPC ........... 382/290; 382/289; 382/287; 382/296; 345/608; 348/583; 702/150

(58) Field of Classification Search
None
See application file for complete search history.

(56) References Cited

U.S. PATENT DOCUMENTS 4,717,971 A * 1/1988 Sawyer .......................... 386/281
5,235,651 A * 8/1993 Nafarieh ....................... 382/290

(Continued)

FOREIGN PATENT DOCUMENTS

JP 6-189083 A 7/1994
JP 7-192086 A 7/1995

(Continued)

OTHER PUBLICATIONS

"Viewer with which a user can view images by touch operation (iPhone, for example) / S2V". [On Line], Willcom Fansite, Search Date: May 23, 2008, Internet <URL:http://www.willcom-fan.com/wzero3/entries/memn0ck/00431/>.

(Continued)

*Primary Examiner* — Randolph I Chu
(74) *Attorney, Agent, or Firm* — Birch, Stewart, Kolasch & Birch, LLP

(57) ABSTRACT

An image processing apparatus includes: a division section for dividing input image data into portions; an orientation determining section for calculating reliabilities of directions of image data of each portion when the directions are regarded as orientations, and setting an orientation with the highest reliability as an orientation of each portion; a display control section for generating display image data including an image of a target portion whose reliability of an orientation is less than a predetermined value and images of designation regions from which a user's input to designate the orientation of the target portion is entered; and a character recognition section for recognizing characters of each portion in such a manner that the orientation is designated from the designation regions or set by the orientation determining section. This allows prompt recognition of characters of a portion whose reliability of orientation is low, in accordance with a right orientation.

11 Claims, 24 Drawing Sheets

(56) References Cited

U.S. PATENT DOCUMENTS

| | | | |
|---|---|---|---|
| 5,301,036 A * | 4/1994 | Barrett et al. | 358/448 |
| 5,335,290 A * | 8/1994 | Cullen et al. | 382/176 |
| 5,563,403 A | 10/1996 | Bessho et al. | |
| 5,649,033 A * | 7/1997 | Morikawa et al. | 382/297 |
| 6,137,905 A * | 10/2000 | Takaoka | 382/173 |
| 6,222,545 B1 | 4/2001 | Suzuki et al. | |
| 6,377,705 B1 * | 4/2002 | Sato et al. | 382/197 |
| 6,466,302 B1 | 10/2002 | Rousseau et al. | |
| 6,577,763 B2 * | 6/2003 | Fujimoto et al. | 382/199 |
| 6,697,091 B1 | 2/2004 | Rzepkowski et al. | |
| 6,778,712 B1 * | 8/2004 | Yabuki et al. | 382/305 |
| 6,785,488 B2 | 8/2004 | Katsuyama | |
| 6,798,905 B1 * | 9/2004 | Sugiura et al. | 382/168 |
| 6,993,205 B1 * | 1/2006 | Lorie et al. | 382/290 |
| 7,010,165 B2 * | 3/2006 | Hullender et al. | 382/186 |
| 7,031,553 B2 * | 4/2006 | Myers et al. | 382/289 |
| 7,151,860 B1 * | 12/2006 | Sakai et al. | 382/297 |
| 7,203,364 B2 * | 4/2007 | Yamazaki | 382/177 |
| 7,215,828 B2 * | 5/2007 | Luo | 382/289 |
| 7,248,809 B2 | 7/2007 | Kim et al. | |
| 7,251,349 B2 * | 7/2007 | Najman et al. | 382/113 |
| 7,305,619 B2 * | 12/2007 | Kaneda et al. | 715/273 |
| 7,333,676 B2 * | 2/2008 | Myers et al. | 382/289 |
| 7,412,095 B2 * | 8/2008 | Hullender et al. | 382/186 |
| 7,671,845 B2 | 3/2010 | Keely | |
| 7,881,561 B2 * | 2/2011 | Zuev et al. | 382/289 |
| 8,023,741 B2 * | 9/2011 | Ferman et al. | 382/182 |
| 8,023,770 B2 * | 9/2011 | Ferman et al. | 382/289 |
| 8,103,099 B2 * | 1/2012 | Andel et al. | 382/181 |
| 8,130,385 B2 * | 3/2012 | Satoh et al. | 356/620 |
| 8,144,989 B2 * | 3/2012 | Speigle et al. | 382/177 |
| 8,160,365 B2 * | 4/2012 | Campbell et al. | 382/190 |
| 8,208,725 B2 * | 6/2012 | Ferman et al. | 382/177 |
| 8,229,248 B2 * | 7/2012 | Ferman et al. | 382/290 |
| 8,290,306 B2 * | 10/2012 | Okumura | 382/297 |
| 2004/0119868 A1 | 6/2004 | Kim | |
| 2005/0105947 A1 | 5/2005 | Kim et al. | |
| 2006/0061599 A1 | 3/2006 | Yu et al. | |
| 2007/0157084 A1 * | 7/2007 | Yano et al. | 715/527 |
| 2009/0316235 A1 | 12/2009 | Morimoto | |
| 2010/0103481 A1 | 4/2010 | Morimoto et al. | |
| 2010/0123928 A1 | 5/2010 | Morimoto et al. | |
| 2011/0199638 A1 | 8/2011 | Ogino et al. | |
| 2011/0216356 A1 | 9/2011 | Hiraki | |
| 2011/0311161 A1 * | 12/2011 | Ferman et al. | 382/289 |
| 2012/0105886 A1 | 5/2012 | Takai et al. | |
| 2012/0315954 A1 | 12/2012 | Ahn et al. | |

FOREIGN PATENT DOCUMENTS

| | | |
|---|---|---|
| JP | 9-69136 A | 3/1997 |
| JP | 2000-32247 A | 1/2000 |
| JP | 2004-56782 A | 2/2004 |
| JP | 2005-269524 A | 9/2005 |
| JP | 2006-72580 A | 3/2006 |
| JP | 2007-200280 A | 8/2007 |
| JP | 2010-4490 A | 1/2010 |
| JP | 2010-109559 A | 5/2010 |
| JP | 2011-180928 A | 9/2011 |
| JP | 2012-114792 A | 6/2012 |

OTHER PUBLICATIONS

U.S. Office Action for co-pending U.S. Appl. No. 13/649,010, dated Jan. 25, 2013.

* cited by examiner

FIG. 2(a)  Scanned Image
(Input Image)
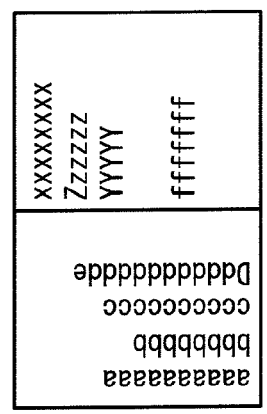
FIG. 2(b)  Result Of Division
Into Portions
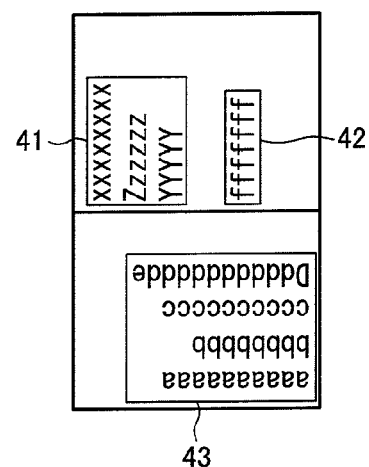

FIG. 5(a)

Exemplary Result Of Determining Reliability Of Orientation Of Portion

| Portion ID | Reliability Of Orientations In Four Directions Of Portion | | | |
|---|---|---|---|---|
| | Direction Of 0 Degree | Direction Of 90 Degrees | Direction Of 180 Degrees | Direction Of 270 Degrees |
| 1 | 15 | 80 | 10 | 40 |
| 2 | 10 | 35 | 10 | 40 |
| 3 | 35 | 20 | 90 | 15 |

FIG. 5(b)

Exemplary Result Of Determining Orientation Of Portion

| Portion ID | Orientation Of Portion |
|---|---|
| 1 | 90 Degrees |
| 2 | 270 Degrees |
| 3 | 180 Degrees |

FIG. 6 (a)  Result Of Determining Orientation
Of Portion And Reliability
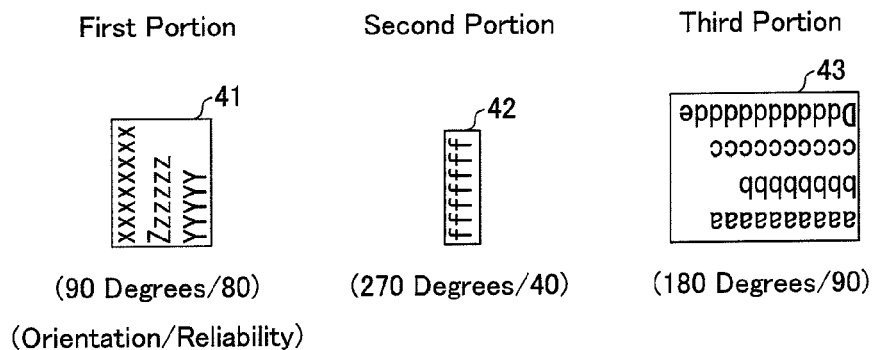
(Orientation/Reliability)
FIG. 6 (b)  Target Portion For
Preview-Display
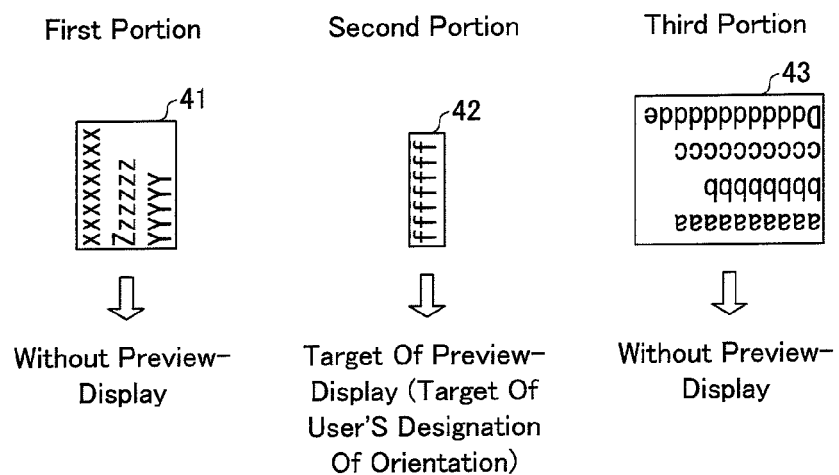

FIG. 16 (a)

| Order Of Reliability | Density (Color) Of Designation Region |
|---|---|
| Highest | (R,G,B) = (R1, 0, 127) |
| Second-Highest | (R,G,B) = (R2, 0, 127) |
| Third-Highest | (R,G,B) = (R3, 0, 127) |
| Fourth-Highest | (R,G,B) = (R4, 0, 127) |

FIG. 16 (b)

| Density (Color) According To Order Of Reliability | |
|---|---|
| R1 | 20 |
| R2 | 75 |
| R3 | 140 |
| R4 | 200 |

FIG. 16 (c)

| Density (Color) According To Reliability | |
|---|---|
| R1 | $255 - C_1 * 255$ |
| R2 | $255 - C_2 * 255$ |
| R3 | $255 - C_3 * 255$ |
| R4 | $255 - C_4 * 255$ |

FIG. 18(a)

| Order Of Reliability | Size Of Designation Region |
|---|---|
| Highest | Reference (Maximum) Size * M1 |
| Second-Highest | Reference (Maximum) Size * M2 |
| Third-Highest | Reference (Maximum) Size * M3 |
| Fourth-Highest | Reference (Maximum) Size * M4 |

FIG. 18(b)

| Magnification According To Order Of Reliability ||
|---|---|
| M1 | 4/4 |
| M2 | 3/4 |
| M3 | 2/4 |
| M4 | 1/4 |

FIG. 18(c)

| Magnification According To Order Of Reliability ||
|---|---|
| M1 | C1 |
| M2 | C2 |
| M3 | C3 |
| M4 | C4 |

FIG. 18(d)

| Ratio With Respect To Highest Reliability ||
|---|---|
| C1 | Highest Reliability/Highest Reliability |
| C2 | Second-Highest Reliability/Highest Reliability |
| C3 | Third-Highest Reliability/Highest Reliability |
| C4 | Fourth-Highest Reliability/Highest Reliability |

IMAGE PROCESSING METHOD AND APPARATUS FOR DETERMINING ORIENTATIONS BASED ON RELIABILITIES OF A PLURALITY OF PORTIONS INTO WHICH IMAGE HAS BEEN DIVIDED OR FOR DETERMINING ORIENTATIONS OF PORTIONS OF IMAGE DIVIDED BY USER'S INPUT SO AS TO RECOGNIZE CHARACTERS FOR EACH DIVIDED PORTION OF IMAGE, IMAGE FORMING APPARATUS, AND STORAGE MEDIUM

This Nonprovisional application claims priority under 35 U.S.C. §119(a) on Patent Application No. 2009-142552 filed in Japan on Jun. 15, 2009, the entire contents of which are hereby incorporated by reference.

TECHNICAL FIELD

The present invention relates to an image processing method, an image processing apparatus, an image forming apparatus, and a program, each of which allows determining an orientation of image data so as to recognize characters, and a storage medium in which the program is stored.

BACKGROUND ART

As an image processing technique, there has been conventionally known a technique for recognizing characters in image data. In this technique, character recognition is performed with respect to image data of a document image scanned by an image reading apparatus for example.

In a case of character recognition, if image data is rotated by 90 degrees or 180 degrees from a normal state, it is impossible to recognize characters correctly. Therefore, it is necessary to determine an orientation of image data so as to recognize characters based on the orientation indicated by the result of the determination.

On the other hand, some image data includes a plurality of regions with different formats, such as a table or a graph including characters. It is difficult to determine an orientation of such image data. In order to deal with this problem, Patent Literature 1 for example discloses segmentation of a character region in a document image into a plurality of portions such as a text region, a title region, a character-in-table region, and a caption-drawing region. Then, the orientation of the document image is determined by one of the following methods, and thereafter character recognition is performed with respect to whole character regions.

(1) A text region, a title region, a character-in-table region, and a caption-drawing region are given priorities, the orientation of a document is determined based on a region given a higher priority, and the result of the determination is regarded as the orientation of the document.

(2) The orientation of a character region is determined using the result of determination with high degree of confidence, and if the same result of determination is obtained among a plurality of character regions, the orientation indicated by the result of determination is regarded as the orientation of a document.

(3) The orientations of all character regions are determined, and the orientation indicated by many number of the results of determination is regarded as the orientation of a document.

Further, Patent Literature 2 describes a technique in which image data is divided into a plurality of regions, and the degree of reliability of each divided region when it is used for determining an orientation of a whole document is obtained, and then character data is cut out from a region with the highest degree of reliability, and the orientation of image data is determined based on the region with the highest degree of reliability.

CITATION LIST

Patent Literatures

[Patent Literature 1]
Japanese Patent Application Publication, Tokukaihei, No. 9-69136 A (published on Mar. 11, 1997)
[Patent Literature 2]
Japanese Patent Application Publication, Tokukai, No. 2000-32247 A (published on Jan. 28, 2000)
[Patent Literature 3]
Japanese Patent Application Publication, Tokukaihei, No. 6-189083 A (published on Jul. 8, 1994)
[Patent Literature 4]
Japanese Patent Application Publication, Tokukaihei, No. 7-192086 A (published on Jul. 28, 1995)

SUMMARY OF INVENTION

Technical Problem

In both of the techniques disclosed in Patent Literatures 1 and 2, image data is divided into a plurality of regions, the orientations of the divided regions are obtained, and the orientations of the divided regions are regarded as the orientation of image data as a whole. For example, among the orientations of the divided regions, an orientation with high degree of reliability is regarded as the orientation of image data. Consequently, there occurs a problem that in a case where character recognition of whole image data is performed based on the thus determined orientation of the image data, if the image data includes a plurality of regions whose orientations of characters are different from each other, it is impossible to recognize characters of such regions correctly. On the other hand, one possible option to increase the ratio of character recognition is to rotate image data or dictionary data for reference when recognizing characters. However, such option requires rotation of whole image data or whole dictionary data, raising a problem that character recognition requires a long time.

Solution to Problem

An image processing apparatus of the present invention includes: a division section for dividing input image data into a plurality of portions; an orientation determining section for calculating reliabilities of upper-, lower-, left-, and right-directions of image data of each of the plurality of portions when the upper-, lower-, left-, and right-directions are regarded as orientations, and setting an orientation with the highest reliability out of the calculated reliabilities as an orientation of said each of the plurality of portions; a display control section for, when the plurality of portions whose orientations are set by the orientation determining section include a target portion whose reliability of an orientation is less than a predetermined value and a non-target portion whose reliability of an orientation is not less than the predetermined value, generating display image data used when a display device displays at least an image of the target portion and images of designation regions by one of which a user's input to designate the orientation of the target portion is entered; and a character recognition section for recognizing characters of the plurality portions in such a manner that the orientation of the target portion is an orientation designated from one of the designation regions and the orientation of the non-target portion is an orientation set by the orientation determining section.

An image processing method, comprising the steps of: (i) segmenting input image data into a plurality of portions; (ii) calculating reliabilities of upper-, lower-, left-, and right-directions of image data of each of the plurality of portions when the upper-, lower-, left-, and right-directions are regarded as orientations, and setting an orientation with the highest reliability out of the calculated reliabilities as an orientation of said each of the plurality of portions; (iii) when the plurality of portions whose orientations are set in the step (ii) include a target portion whose reliability of an orientation is less than a predetermined value and a non-target portion whose reliability of an orientation is not less than the predetermined value, generating display image data used when a display device displays at least an image of the target portion and images of designation regions by one of which a user's input to designate the orientation of the target portion is entered; and (iv) recognizing characters of the plurality portions in such a manner that the orientation of the target portion is an orientation designated from one of the designation regions and the orientation of the non-target portion is an orientation set in the step (ii).

With the configuration, in a case of a portion whose reliability of orientation determined by the orientation determining section (in the step (ii)) is not less than the predetermined value (non-target portion), characters of the non-target portion are recognized by the character recognition section (in the step (iv)) in accordance with the orientation of the non-target portion. On the other hand, in a case of a portion whose reliability of the orientation determined by the orientation determining section (in the step (ii)) is less than the predetermined value (target portion), not only an image of the target-portion but also images of the designation regions by one of which the user's input to designate the orientation of the target-portion is entered are displayed by the display device. Then, characters of the target portion are recognized by the character recognition section (in the step (iv)) in accordance with the orientation designated by the user from one of the designation regions.

Consequently, even in a case of input image data in which a portion whose reliability of orientation is low (target portion) and a portion whose reliability of orientation is high (non-target portion) coexist, it is possible to correctly recognize characters of individual portions in accordance with the right orientations of the portions. Further, since the target portion and the non-target portion are subjected to different processes in order to recognize their characters in accordance with the right orientations, it is possible to perform highly accurate character recognition of input image data as a whole while reducing a time of processes up to the character recognition process.

Advantageous Effects of Invention

With the configuration of the present invention, even in a case of input image data in which a portion whose reliability of orientation is low (target portion) and a portion whose reliability of orientation is high (non-target portion) coexist, it is possible to correctly recognize characters of individual portions in accordance with the right orientations of the portions. Further, since the target portion and the non-target portion are subjected to different processes in order to recognize their characters in accordance with the right orientations, it is possible to perform highly accurate character recognition of input image data as a whole while reducing a time of processes up to the character recognition process.

BRIEF DESCRIPTION OF DRAWINGS

FIG. 2(a) is an explanatory drawing showing an example of input image data obtained by an input apparatus (scanner) for example. FIG. 2(b) is an explanatory drawing showing a plurality of portions into which the input image data shown in FIG. 2(a) is divided by the division section shown in FIG. 1.

FIG. 5(a) is an explanatory drawing showing the reliabilities in the orientations of 0, 90, 180, and 270 degrees, respectively, with respect to each of first to third portions shown in FIG. 2(b). FIG. 5(b) is an explanatory drawing showing the orientations of the first to third portions which orientations are determined based on the reliabilities in the orientations of each of the first to third portions shown in FIG. 5(a).

FIG. 6(a) is an explanatory drawing showing the orientations and the reliabilities of the first to third portions, the orientations and the reliabilities being obtained from the results of the determinations shown in FIGS. 5(a) and 5(b). FIG. 6(b) is an explanatory drawing showing examples of whether preview displays in the display device shown in FIG. 1 for individual portions are necessary or not is determined based on relations between the reliabilities in the orientations for individual regions and threshold values for the reliabilities.

FIG. 16(a) is an explanatory drawing showing an example of the colors of the designation regions with the highest reliability to the fourth-highest reliability in a case where the densities (colors) of the designation regions are changed in the order of the reliability of orientation. FIG. 16(b) is an explanatory drawing showing values of R (R1-R4) shown in FIG. 16(a). FIG. 16(c) is an explanatory drawing showing another manner for determining R(R1-R4) shown in FIG. 16(a).

FIG. 18(a) is an explanatory drawing showing an example of the size (length) of the designation regions with the highest reliability to the fourth-highest reliability in a case where the size (length) of the four designation regions corresponding to the four orientations are changed according to the order of reliabilities of the orientations. FIG. 18(b) is an explanatory drawing showing values (magnifications) of M (M1 to M4) shown in FIG. 18(a). FIG. 18(c) is an explanatory drawing showing another manner for determining the values of M (M1 to M4) shown in FIG. 18(a). FIG. 18(d) is an explanatory drawing showing how to determine the values of magnifications (C1 to C4) according to the reliabilities shown in FIG. 18(c).

DESCRIPTION OF EMBODIMENTS

Embodiment 1

The following explains Embodiments of the present invention with reference to drawings.

Figure 1:
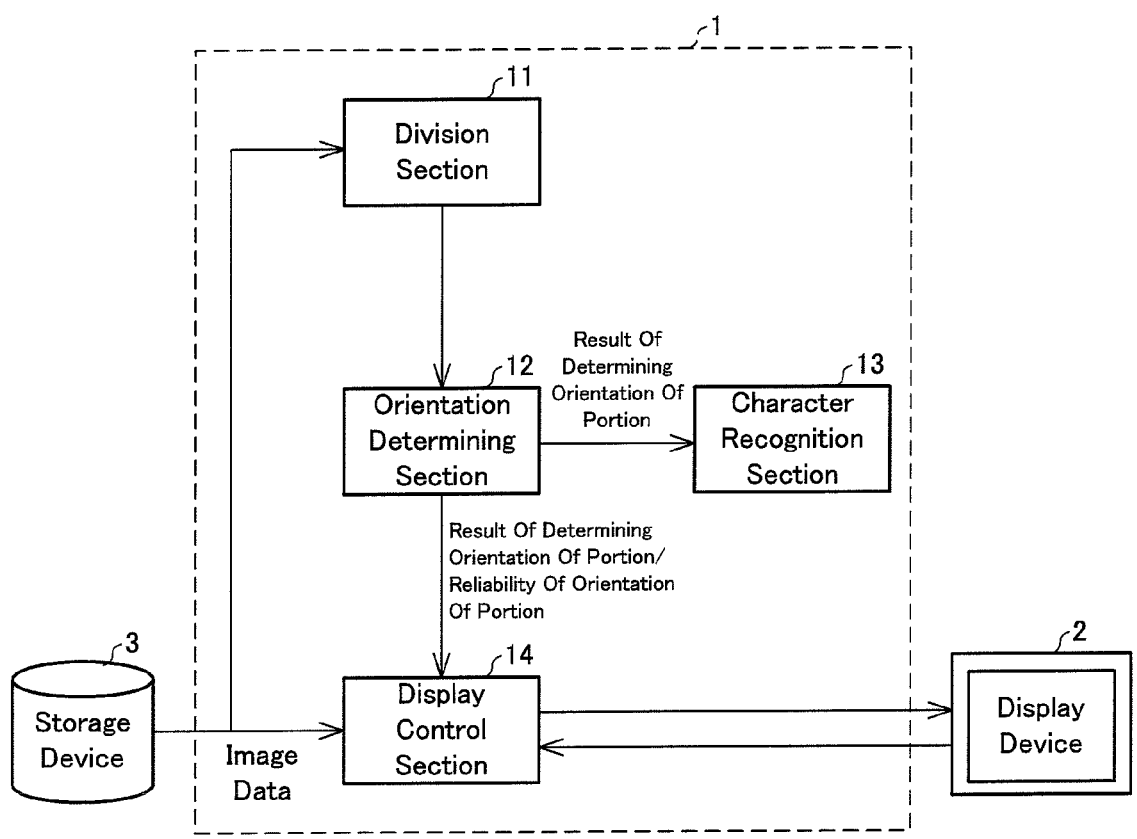
FIG. 1 is a block diagram schematically showing a configuration of an image processing apparatus in accordance with an embodiment of the present invention.

FIG. 1 is a block diagram schematically showing a configuration of an image processing apparatus 1 in accordance with an embodiment of the present invention. The image processing apparatus 1 is included in an image input apparatus for example. The image input apparatus scans an image from a document and acquires image data. The image input apparatus is included in a copying machine or a multifunctional printer having a plurality of functions in addition to a copying function. The image processing apparatus 1 performs an image process with respect to the image data.

As shown in FIG. 1, the image processing apparatus 1 is connected to a display device 2 and a storage device 3. The display device 2 is provided in an operation panel of the image forming apparatus. The display device 2 is covered with a touch panel, and an image displayed by the display device 2 also serves as a graphical user interface. Note that the display device 2 can be general image display means such as a liquid crystal display.

The storage device 3 is data storage means provided in the image forming apparatus. The storage device 3 can be a general hard disc device or other storage device.

In the configuration in FIG. 1, image data obtained by the image input apparatus is stored in the storage device 3. The image processing apparatus 1 reads out the image data from the storage device 3, and then carries out an image process with respect to the image data. The image data that has been subjected to the image process is stored in the storage device 3 again. The image processing apparatus 1 causes the display device 2 to display the image data or a preview-image created from the image data.

As shown in FIG. 1, the image processing apparatus 1 includes a division section 11, an orientation determining section 12, a character recognition section 13, and a display control section 14.

The division section 11 divides a character region in input image data into regions such as a title region, a body text region, a character-in-table region, and a caption region (character region attached to a drawing region) in accordance with attributes of the character region, and calculates a bound box (bound coordinates) of individual regions. In a case of treating image data including an image other than characters, a segmentation section 231 (see FIG. 20) mentioned later may be provided at a previous stage of the division section 11 in order to separate a character region from input image data.

FIG. 2(a) is an explanatory drawing showing an example of input image data obtained by the input apparatus for example. FIG. 2(b) is an explanatory drawing showing a plurality of portions (attribute regions) into which the input image data shown in FIG. 2(a) is divided, i.e. a first portion 41, a second portion 42, and a third portion 43.

In the example shown in FIG. 2(a), the input image data includes three kinds of attribute regions as character regions. The division section 11 divides a character region of the input image data into three portions according to the attribute regions so as to generate portion information.

The image data of the character regions obtained in the division section 11 (character image data of the portions) and the portion information are used in the orientation determining section 12 and the character recognition section 13 in later stages.

Here, an explanation is made as to a detail of a division process by the division section 11. The division section 11 carries out the division process through steps (a1)-(a8) below. This process is carried out for dividing image data into the title, the name of the author, the abstract, and the body text for example.

(a1) Regarding a first line of input image data as a target line and setting a label to a black pixel, i.e. labeling the black pixel.

(a2) Thereafter, the target line is shifted below by one, and a black pixel in the new target line is given a label different from the label given to the black pixel in the previous target line.

(a3) Thereafter, a state of connection between the black pixel of the current target line and the black pixel of the previous target line is determined. When the black pixels are found to be connected with each other as a result of the determination, the pixels are determined as being connected, and the label to the black pixel of the current target line is replaced with the label to the black pixel of the previous target line.

(a4) The steps (a1)-(a3) are repeated to extract a character region. Based on the positions of pixels at the upper end, the lower end, the left end, and the right end of the extracted character region, a bound box for the character region is obtained. The coordinates for the position of a pixel are calculated with the position of the left end of input image data being the origin.

(a5) Thereafter, the distance between adjacent bound boxes is calculated, and character sequences each consisting of adjacent characters are identified based on the distance thus calculated. That is, bound boxes with a distance therebetween being smaller than a predetermined value are bound boxes for the same character sequence, and bound boxes with a distance therebetween being larger than the predetermined value are not bound boxes for the same character sequence. Therefore, by calculating the distance between adjacent bound boxes, it is possible to identify a character sequence.

(a6) Thereafter, one of the character sequences is regarded as a target character sequence, and an average of the lengths in vertical direction (direction vertical to the line) of bound boxes for the target character sequence is calculated. It should be noted that the average is calculated in such a manner that a bound box whose length in vertical direction is less than a threshold value is not considered. This is for eliminating a bound box set to a punctuation mark. Further, an average of coordinates of lower sides of bound boxes for the target character sequence is calculated.

(a7) Thereafter, it is determined whether other character sequence exists or not within a predetermined range from a position defined by an average of coordinates of lower ends of the bound boxes for the target character sequence to a position away from the aforementioned position in the vertical direction by a length which is set using an average of lengths of the bound boxes in a predetermined direction as a reference. If the result of the determination shows that other character sequence exists in the predetermined range, the character sequence is determined as belonging to the same region as the target character sequence belongs to. If the result of the determination shows that other character sequence does not exist in the predetermined range, it is determined that a character sequence belonging to the same region as the target character sequence belongs to does not exist. The predetermined range is, for example, 1.5 times as large as an average of the lengths of the bound boxes in the vertical direction.

(a8) The target character sequence is shifted and the steps (a6) and (a7) are repeated. This allows dividing a document image into a plurality of regions according to the attributes of character regions.

Figure 3A:
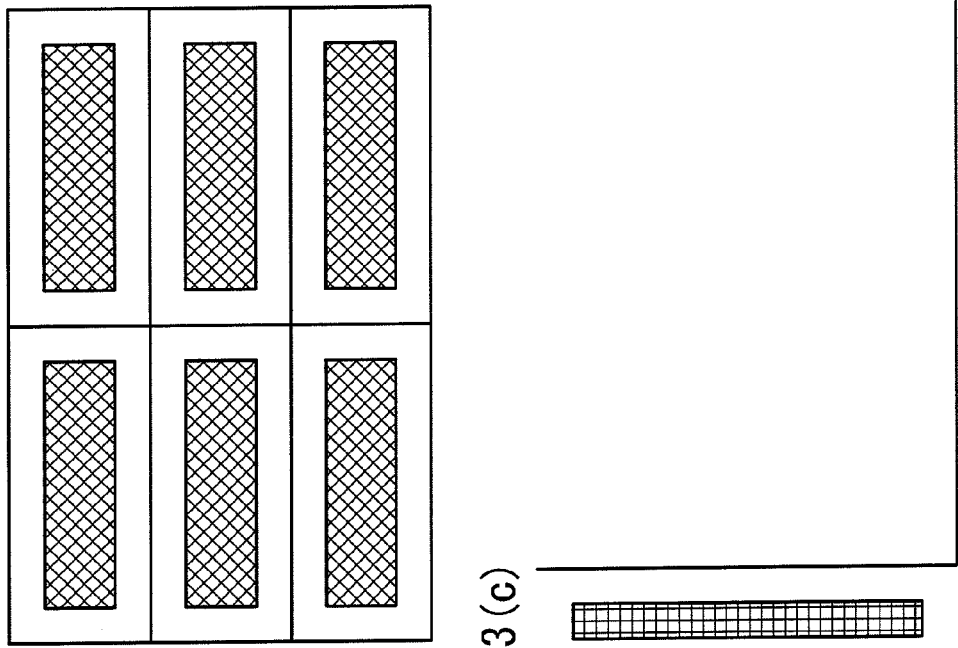
FIG. 3(a) is an explanatory drawing showing a plurality of blocks (portions) extracted by the division section shown in FIG. 1 from image data including a plurality of portions whose character regions have different attributes.
Figure 3B:
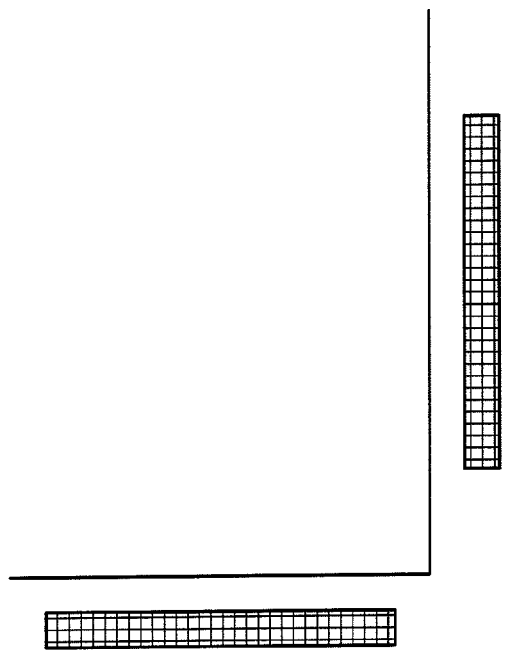
FIG. 3(b) is an explanatory drawing showing an example of a character-in-table region extracted by the division section from image data.
Figure 3C:
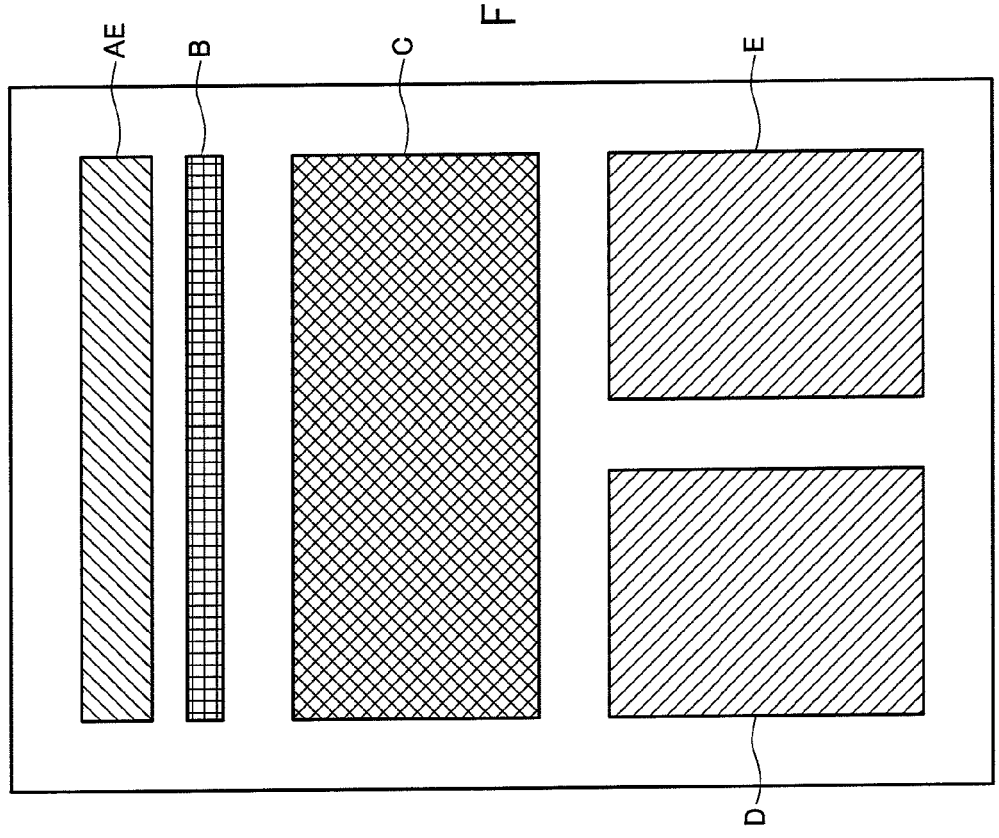
FIG. 3(c) is an explanatory drawing showing an example of a caption region extracted by the division section from image data.

FIG. 3(a) is an explanatory drawing showing a plurality of blocks (portions) extracted by the division section 11 from image data including a plurality of portions with different character region attributes. FIG. 3(b) is an explanatory drawing showing an example of a character-in-table region which is extracted by the division section 11 from image data. FIG. 3(c) is an explanatory drawing showing an example of a caption region extracted by the division section 11 from image data.

In FIG. 3(a), the portion AE is a title. This title is positioned at an upper part or a right end of image data (document image), and the size of the portion AE (bound box) is large. The size (size in a line direction) is, for example, more than 1.5 times larger than the size of a portion (bound box) which is considered as a body text. In the drawing, a portion B is the name of an author, a portion C is an abstract (region which is not required to be discriminated from the body text), and a portion D is the body text.

The character-in-table region shown in FIG. 3(b) is determined as a character-in-table region when its bound box (portion) is surrounded by ruled lines (continuous black pixels) as shown in FIG. 3(b). The caption region shown in FIG. 3(c) is determined as a caption region when its bound box (portion) exists near a line (continuous black pixels) as shown in FIG. 3(c). In this determination, the length of the line (continuous black pixels) is within a range approximately 1.5 times longer than an average of lengths in vertical direction of bound boxes (portions) of caption regions.

The orientation determining section 12 determines the orientation of individual character image data of portions by using character image data of portions and portion information which are supplied from the division section 11. When determining the orientation of individual portions, initially, the reliabilities of, for example, four directions, 0°, 90°, 180°, and 270° as the orientation of the portion are calculated. Then, the orientation determining section 12 determines an orientation with the highest reliability out of reliabilities of individual orientations as the orientation of the portion. Accordingly, the reliability of the orientation of the portion is the reliability of the orientation with the highest reliability.

Note that the orientation being 0° indicates that the orientation of a portion is identical with a normal orientation of a character. The orientation being 90° indicates that the orientation of a portion is rotated counterclockwise by 90° with respect to a normal orientation of a character (i.e. rotating the portion clockwise by 90° will put a character in normal orientation). The orientation being 180° indicates that the orientation of a portion is rotated by 180° with respect to a normal orientation of a character (i.e. rotating the portion by 180° will put a character in normal orientation). The orientation being 270° indicates that the orientation of a portion is rotated counterclockwise by 270° with respect to a normal orientation of a character (i.e. rotating the portion clockwise by 270° will put a character in normal orientation).

The following details an operation carried out by the orientation determining section 12 to determine the orientation. The orientation determining section 12 determines the orientation of an image with respect to each portion by use of the method disclosed in Japanese Patent Application Publication No. 6-189083 (Patent Literature 3 for example). The process for determining the orientation is as follows.

(b1) Characters are recognized using the OCR technique, the characters in an input image are extracted one by one, and the characters are patterned.

(b2) Features of a character pattern in the input image (hereinafter referred to as input character pattern) are compared with features of a character pattern in a database (hereinafter referred to as databased character pattern). Matching is performed in such a manner that the input character pattern extracted from the input image is overlapped with the databased character pattern to compare whiteness/blackness of each pixel. When whiteness/blackness of all pixels is common between the input character pattern and the databased character pattern, it is determined that the input character pattern is the databased character pattern with which the input character pattern is compared. When there is no databased character pattern whose whiteness/blackness of all pixels is the same as that of an input character pattern, characters of a databased character pattern having the largest number of pixels that match pixels of an input character pattern are considered as characters of the input character pattern. When a predetermined matching ratio is not satisfied, the input character pattern is determined as not discernable.

(b3) An extracted input character pattern is rotated by 90 degrees, 180 degrees, and 270 degrees, and the process of (b2) is carried out with respect to each rotation angle.

(b4) As a result of determining the orientation, there is output the number of characters discernable in each of four directions of 0, 90, 180, and 270 degrees.

The following explains a process for setting the reliability in the orientation determination carried out by the orientation determining section 12. Through the orientation determining process, the number of characters discernable in individual directions is obtained. The orientation determining section 12 sets the reliability with respect to each of four directions of 0, 90, 180, and 270 degrees based on the number of characters discernable in individual directions.

Figure 4A:
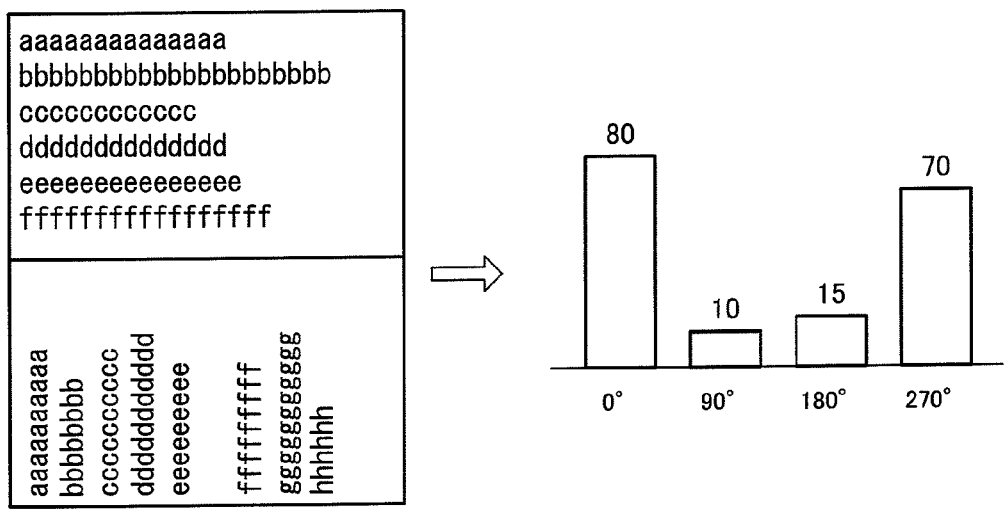
FIG. 4(a) is an explanatory drawing showing the result of setting reliabilities of individual orientations of a portion including two kinds of character images with different orientations.
Figure 4B:
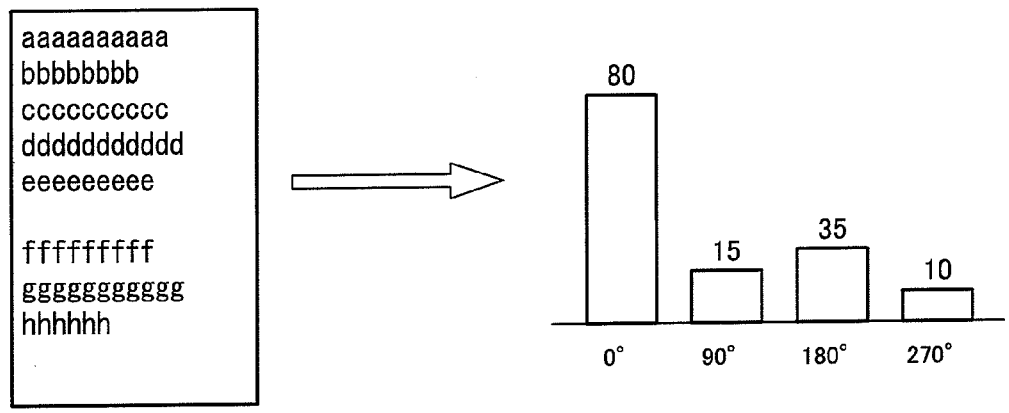
FIG. 4(b) is an explanatory drawing showing the result of setting reliabilities of individual orientations of a portion including character images with the same orientation.
Figure 4C:
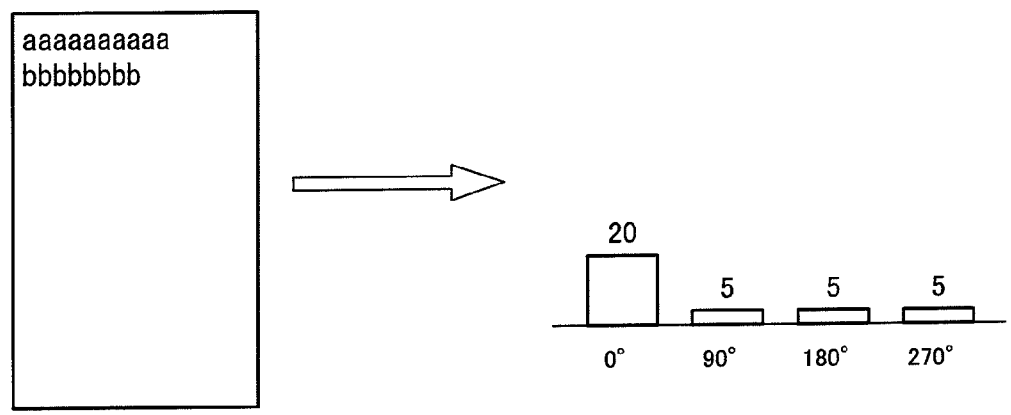
FIG. 4(c) is an explanatory drawing showing the result of setting reliabilities of individual orientations of a portion including a small number of character images.

FIG. 4(a) is an explanatory drawing showing the result of setting reliabilities of individual orientations of a portion including two kinds of character images with different orientations. FIG. 4(b) is an explanatory drawing showing the result of setting reliabilities of individual orientations of a portion including character images with the same orientation. FIG. 4(c) is an explanatory drawing showing the result of setting reliabilities of individual orientations of a portion including a small number of character images.

As shown in FIG. 4(a), in the case where a portion includes two kinds of character images with different orientations (character images with orientations of 0 and 270 degrees, respectively), the reliabilities of the orientations of 0 and 270 degrees have high values. In this case, the difference between the reliabilities of the two orientations is small. Further, as shown in FIG. 4(b), in the case where a portion includes character images with the same orientation (orientation of 0 degree), the reliability in the orientation of 0 degree has a high value. Further, as shown in FIG. 4(c), in the case where a portion includes a small number of character images, the reliabilities are low in all orientations.

FIG. 5(a) is an explanatory drawing showing the reliabilities of the four orientations of 0, 90, 180, and 270 degrees of each of the first to third portions 41 to 43 shown in FIG. 2(b). FIG. 5(b) is an explanatory drawing showing respective orientations of the first to third portions 41 to 43 which orientations are determined based on the reliabilities of the four orientations of each of the first to third portions 41 to 43 shown in FIG. 5(a). According to the result of FIG. 5(b), the orientation of the first portion 41 is determined as 90 degrees, the orientation of the second portion 42 is determined as 270 degrees, and the orientation of the third portion 43 is determined as 180 degrees.

The display control section 14 acquires the reliability of the orientation of each portion. In a case where image data includes a portion whose reliability is less than a predetermined threshold (hereinafter referred to as a target portion) exists, the display control section 14 prepares a preview-image of the image data including the target portion and outputs the preview-image to the display device 2. The preview-image includes an image for urging a user to designate the orientation of image data of the target portion. The preview-image may only include image data of a target portion out of input image data.

FIG. 6(a) is an explanatory drawing showing the orientations and the reliabilities of the first to third portions 41 to 43, the orientations and the reliabilities being obtained from the results of the determinations by the orientation determining section 12 shown in FIGS. 5(a) and 5(b). FIG. 6(b) is an explanatory drawing showing examples of whether a preview display in the display device 2 for a portion is necessary or not is determined based on a relation between the reliability of the orientation of the portion and a threshold value for the reliability.

As shown in FIG. 6(a), orientations of individual portions and reliabilities of the orientations (orientation/reliability) are as follows: orientation/reliability in the first portion 41 is 90 degrees/80, orientation/reliability in the second portion 42 is 270 degrees/40, and orientation/reliability in the third portion 43 is 180 degrees/90. Assume that the threshold for the reliability of an orientation is set to 70. In this case, as shown in FIG. 6(b), the first and third portions 41 and 43 are not required to be preview-displayed and the second portion 42 is required to be preview-displayed (required to be a target of preview-display).

Figure 7:
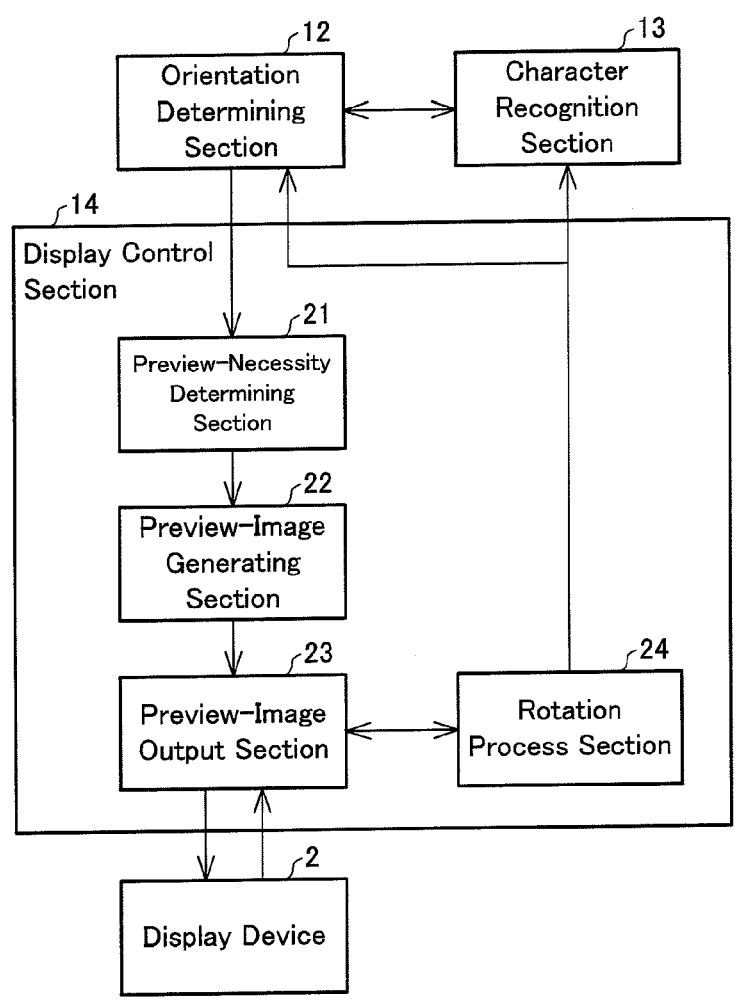
FIG. 7 is a block diagram showing a configuration of the display control section shown in FIG. 1.

In order to carry out the above operation, the display control section 14 includes, as shown in FIG. 7, a preview-necessity determining section 21, a preview-image generating section (display image generating section) 22, a preview-image output section (display image output section) 23, and a rotation process section 24. FIG. 7 is a block diagram showing a configuration of the display control section 14 shown in FIG. 1.

The preview-necessity determining section 21 compares the reliabilities of orientations of individual portions which reliabilities have been determined by the orientation determining section 12, and determines it is necessary for a user to enter the orientations of individual portions or not. That is, the preview-necessity determining section 21 determines whether it is necessary to preview-display designation regions 32 for a user to designate at least a target portion and the orientation of the target portion.

(1-1) First Method for Determining Whether Preview Display is Necessary or not

Specifically, the preview-necessity determining section acquires the reliabilities of orientations of individual portions which reliabilities have been determined by the orientation determining section 12, and compares the reliabilities with a predetermined threshold value. As a result of the comparison, the preview-necessity determining section 21 regards a portion whose reliability of orientation is less than a predetermined threshold value (target portion) as being required to be preview-displayed as above, and regards a portion whose reliability of orientation is not less than the predetermined threshold value as being not required to be preview-displayed.

A method for determining whether the preview display is necessary or not is not limited to the first method explained above and later-mentioned other methods may be usable.

When the preview-necessity determining section 21 determines that the image data includes a target portion, the preview-image generating section 22 generates a preview-image of at least the target portion, or generates a preview-image of whole image data including the target portion. Which kind of a preview-image is generated is suitably set in the image processing apparatus 1. Here, an explanation is made as to a case of generating the latter kind of a preview-image.

A preview-image generated by the preview-image generating section 22 includes at least designation regions, and may additionally include a selection region.

The selection region corresponds to the target portion, and serves as a touch panel. The designation region is a region for a user to enter and designate the orientation of a target portion to be displayed as the selection region. As explained later, the selection region is used when carrying out pop-up display.

When generating the selection region, the preview-image generating section 22 reads out, from the storage device 3, image data including a target partial image. Then, the preview-image generating section 22 refers to portion information regarding the target portion out of portion information supplied from the division section 11, and calculates and extracts coordinates of a region corresponding to the target portion in the read-out image data, and generates a selection region. Then, the preview-image generating section 22 positions the generated selection region so that the generated selection region overlaps the target portion of the image data.

The designation regions constitute a frame-shaped touch panel positioned at four sides of the selection region. The designation regions are configured such that a user's touch of one of the designation regions respectively positioned at four sides of the selection region allows specifying a target portion and indicating the orientation of the target portion. When generating the designation regions, the preview-image generating section 22 calculates coordinates of the designation regions, and positions the designation regions so that the designation regions surround the selection region (target portion).

The preview-image output section 23 outputs the preview-image generated by the preview-image generating section 22 to the display device 2. In this case, the preview-image output section 23 downsamples pixels of the preview-image or enlarges the preview-image so that the display device 2 displays the whole of the preview-image with an appropriate size. Further, the preview-image output section carries out a tone correction (gamma correction) in accordance with display characteristics of the display device 2.

The downsampling of pixels of an image or the enlargement of the image is carried out by a nearest neighbor method, a bilinear method, or a bicubic method, for example.

The nearest neighbor method is a method in which either a value of an existing pixel that is closest to an interpolation pixel generated by interpolation, or a value of an existing pixel that is in a predetermined positional relationship with an interpolation pixel is provided as a value of the interpolation pixel. The bilinear method is a method in which (i) a weighted average of values of four existing pixels surrounding an interpolation pixel is obtained, and (ii) the obtained average is provided as a value of the interpolation pixel. The bicubic method is a method in which interpolation calculations are carried out by use of a total of 16 existing pixels (the four existing pixels surrounding the interpolation pixel, and 12 existing pixels surrounding the four existing pixels).

The rotation process section 24 carries out a rotation process for rotating an image (image data) to be displayed by the display device 2. For example, in a case a user enters an instruction to designate the orientation of an image from the designation region, the rotation process section 24 carries out a conversion process, i.e. a rotation process on image data based on the position of the designation region which the user has selected. Rotation of image data is made clockwise for example with respect to every 90 degrees, i.e. by 90 degrees, 180 degrees, or 270 degrees.

The character recognition section 13 compares image data of individual portions included in image data with dictionary data so as to carry out character recognition. Specifically, the character recognition section 13 extracts features of image data by using low-resolution (e.g. 300 dpi) image data converted into two values of black and white (luminance signal), and compares the features of the image data with features of dictionary data so as to carry out character recognition.

In this case, the character recognition section 13 carries out character recognition of image data of a portion whose reliability is not less than a threshold value, in accordance with the orientation determined by the orientation determining section 12. On the other hand, the character recognition section 13 carries out character recognition of image data of a portion whose reliability is less than the threshold value, in accordance with the orientation designated by a user. Note that when the orientation of a target portion is designated, image data of the target portion is rotated by the rotation process section 24 so that the orientation of the image data of the target portion gets equal to the designated orientation. Accordingly, the character recognition section 13 carries out character recognition on the image data having been rotated.

For example, since the result of determination of the orientation of the first portion 41 is 90 degrees, image data of the first portion 41 is rotated clockwise by 90 degrees before being subjected to character recognition. This reduces misrecognition of characters due to difference in orientation, thereby increasing accuracy in character recognition.

(2-1) First Display Example of Square Frame for Portion

Figure 8:
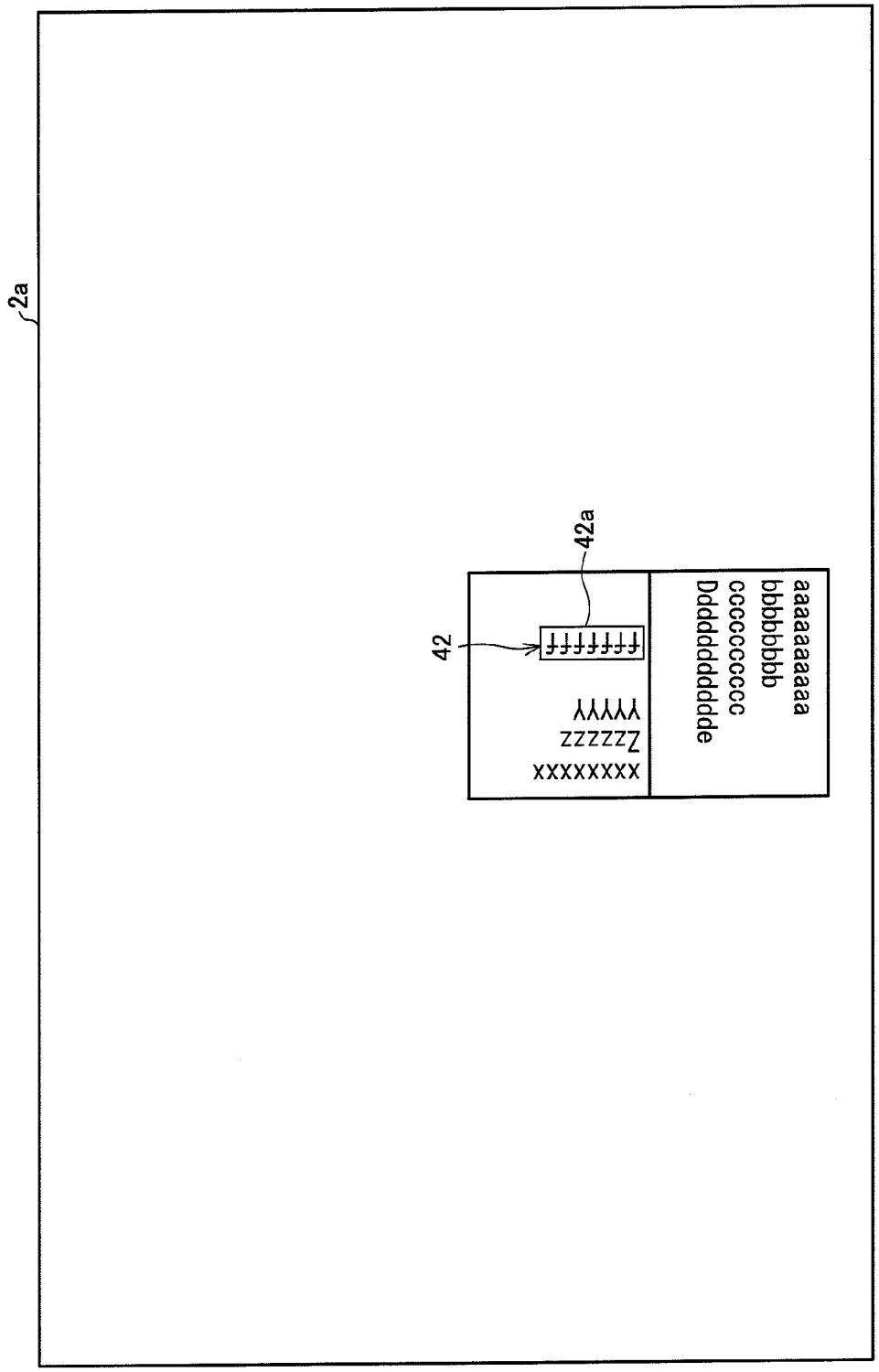
FIG. 8 is an explanatory drawing showing a preview-image of image data including a target portion which preview-image is shown on a display screen of the display device shown in FIG. 2.

In a case of preview-displaying not only a target portion but also all portions, or in a case of preview-displaying a target portion in such a manner that the target portion is included in input image data, a square frame surrounding the target portion may be displayed. FIG. 8 is an explanatory drawing showing a preview-image of image data including a target portion which preview-image is shown on a display screen 2a of the display device 2. In this example, a square frame is displayed only for the second portion 42 that is a target portion. A square frame 42a for the second portion 42 consists of a plurality of designation regions. Note that the display examples of a square frame for a portion is not limited to the first display example, and include later-mentioned display examples.

(3-1) First Example of Pop-Up Display

Figure 9:
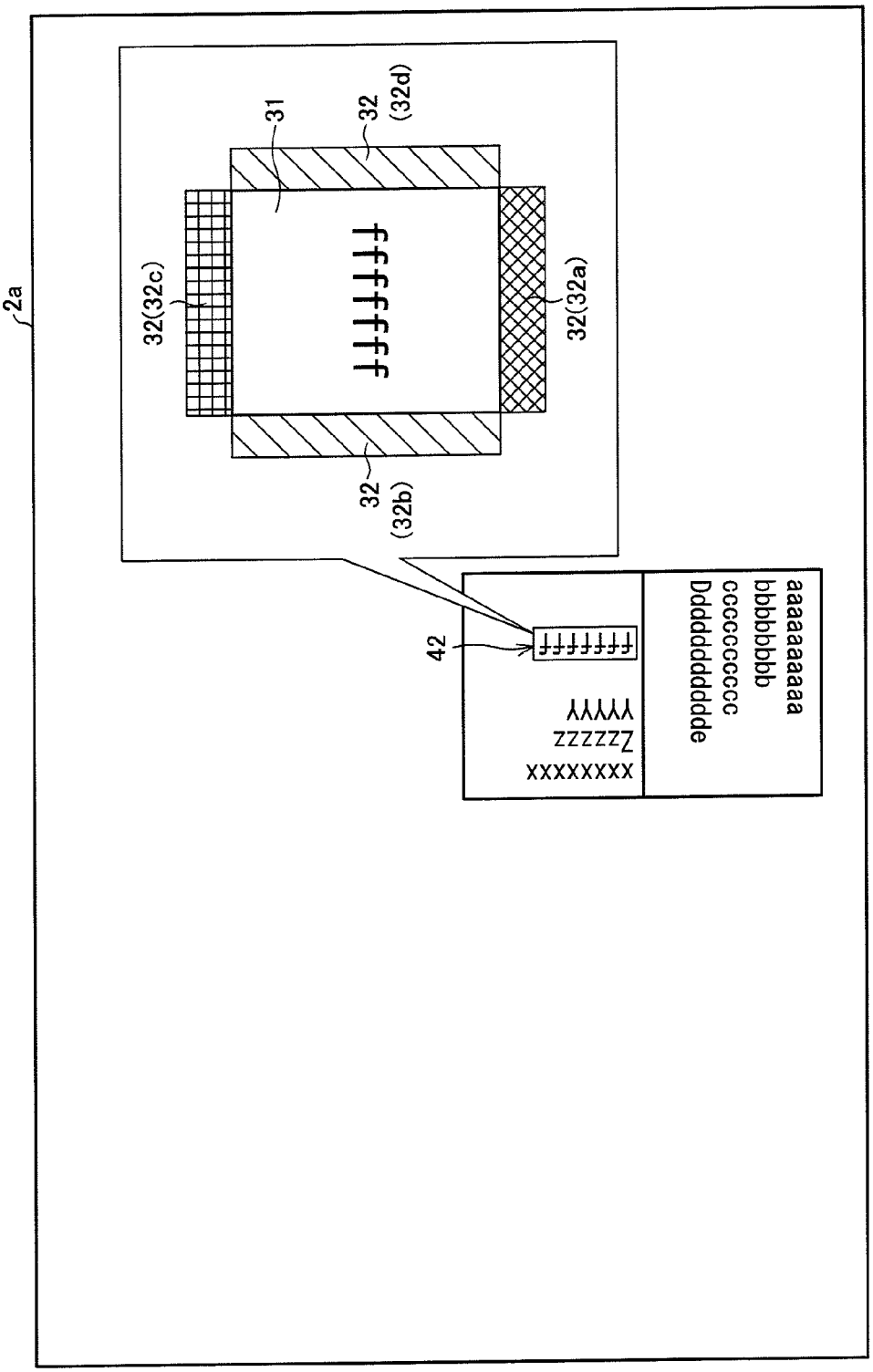
FIG. 9 is an explanatory drawing showing a state where the display screen 2a showing a preview-image of image data popup-displays a selection region 31 and designation regions which correspond to the second portion 42 whose reliability of the orientation is low (less than the predetermined threshold value for the reliability).

FIG. 9 is an explanatory drawing showing a state where the display screen 2a showing a preview-image of image data popup-displays a selection region 31 and designation regions which correspond to the second portion 42 whose reliability of the orientation is low (less than the predetermined threshold value for the reliability).

As described above, as for a portion whose reliability of orientation is lower than the predetermined threshold value, at least an image of the target portion is preview-displayed. The preview-display may be performed in such a manner that the image of the target portion is popup-displayed.

The display state shown in FIG. 9 is obtained when the display state shown in FIG. 8 where the selection region 31 serving as a touch panel is positioned on the second portion 42 is changed by a user's touching of the selection region 31 or a user's touching of one of the designation regions 32. In the display shown in FIG. 9, an image of a target portion is popup-displayed in such a manner that designation regions surround the popup-displayed target portion. The popup display may be performed in such a manner that image data as a whole is preview-displayed and only a target portion pops up from the preview display, or in such a manner that only the target portion pops up as a preview display. FIG. 9 shows the latter case. In this case, the selection region and the designation regions are generated as above.

In the display shown in FIG. 9, when popup-displaying the target portion (selection region 31), the target portion (selection region 31) is displayed in such a manner that the target portion is rotated in accordance with its orientation determined by the orientation determining section 12. The rotation of the target portion is carried out by the rotation process section 24.

The orientation determining section 12 wrongly determines the orientation of the second portion 42 shown in FIG. 6(*a*). That is, although the result of the determination by the orientation determining section 12 indicates that the orientation with the highest reliability is 270 degrees, the orientation with the highest reliability is actually 90 degrees. As a result of the wrong determination, in the popup display in FIG. 9, the second portion 42 is displayed in such a manner as to be rotated clockwise by 270 degrees in accordance with the wrongly determined orientation. Note that the examples of the popup-display are not limited to the first example and include later-mentioned examples.

Figure 10:
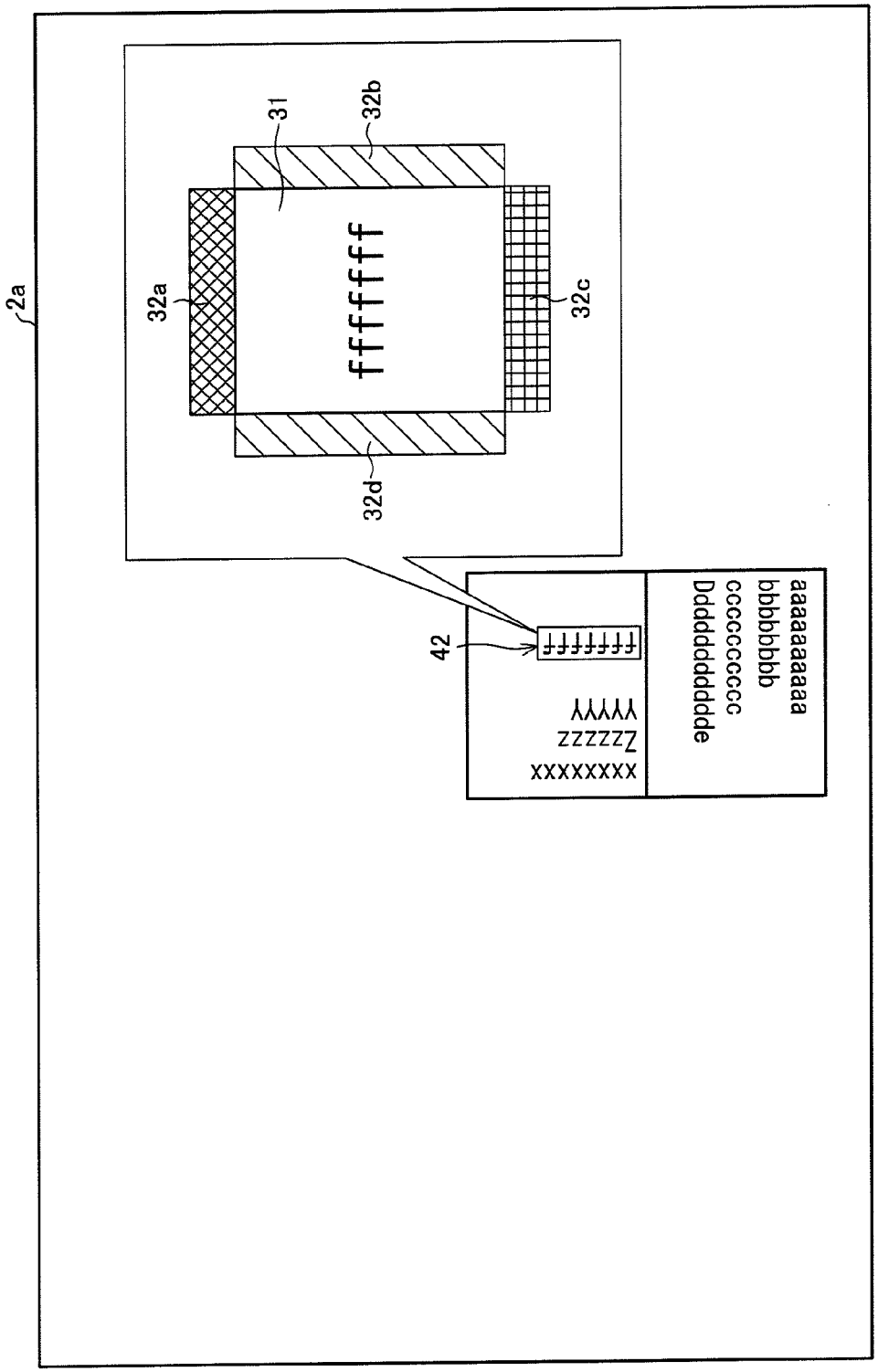
FIG. 10 is an explanatory drawing showing a state in which a target portion (selection region) is rotated so that the direction of an designation region from which a user's input is entered is regarded as an orientation in the popup-display shown in FIG. 9.

In the popup-display, when one of the designation regions 32 is operated, the target portion (selection region 31) is rotated so that the direction of the operated designation region 32 is the orientation of the target portion, as shown in FIG. 10. The rotation process is carried out by the rotation process section 24. The example in FIG. 10 shows a case where designation regions 32*a* to 32*d* are provided and the designation region 32*a* is operated by a user.

The present invention may be arranged such that when displaying a preview-image of whole input image data, not only a target portion but also all portions are popup-displayed. The manner of popup-displaying individual portions in this case is the same as the manner of popup-displaying only a target portion as explained above. That is, the manner of popup-displaying individual portions in this case is such that the portion (selection region 31) and the designation regions 32 are popup-displayed for example.

The popup-display and the preview-display are finished by operation of a display-finish button (not shown). As for the orientation of the whole input image data, the display screen 2*a* of the display device 2 may display a message for urging a user to confirm the orientation of the whole input image data and to enter which direction is the orientation of the image data.

Figure 11:
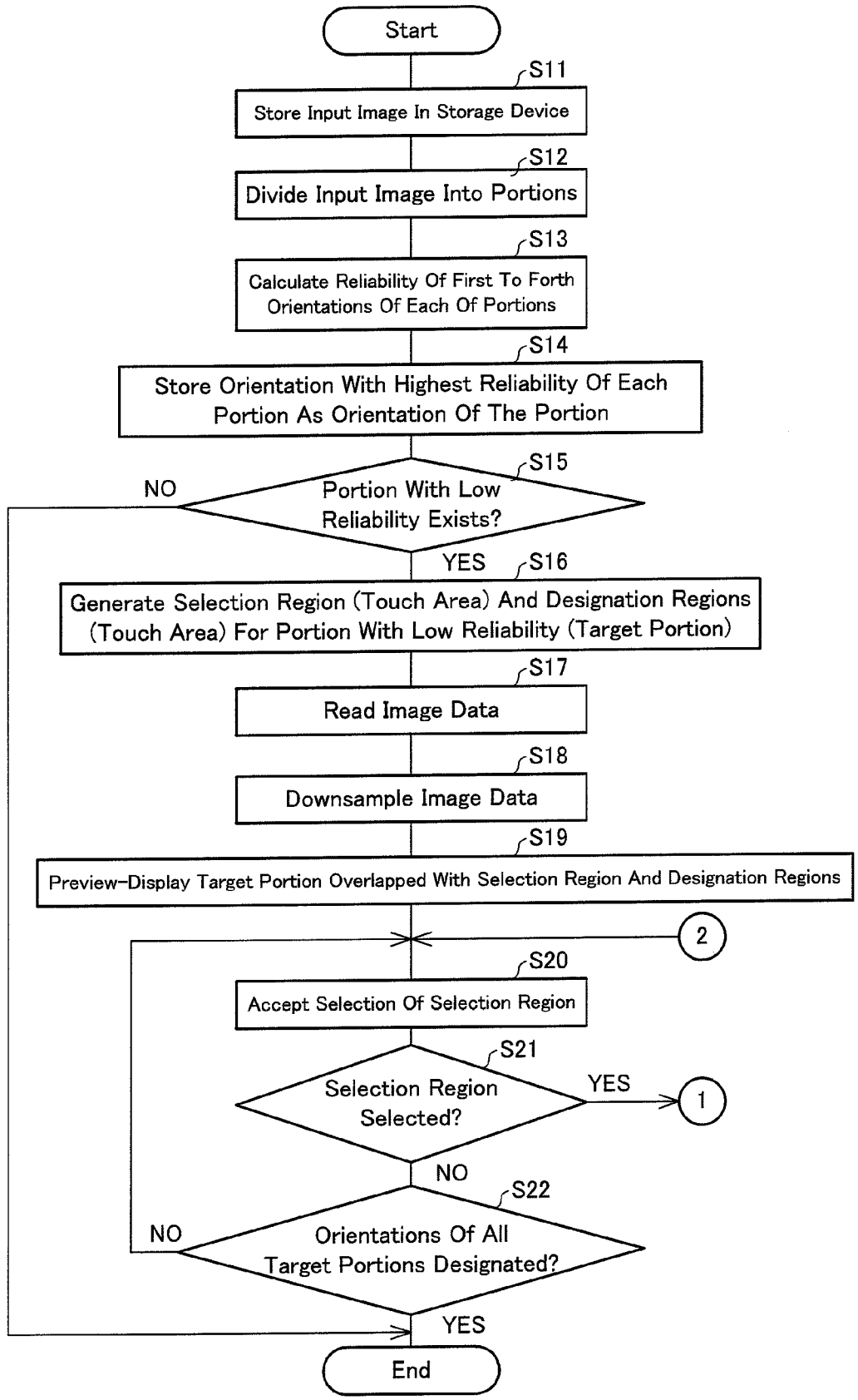
FIG. 11 is a flowchart showing an operation of the image processing apparatus 1 shown in FIG. 1.
Figure 12:
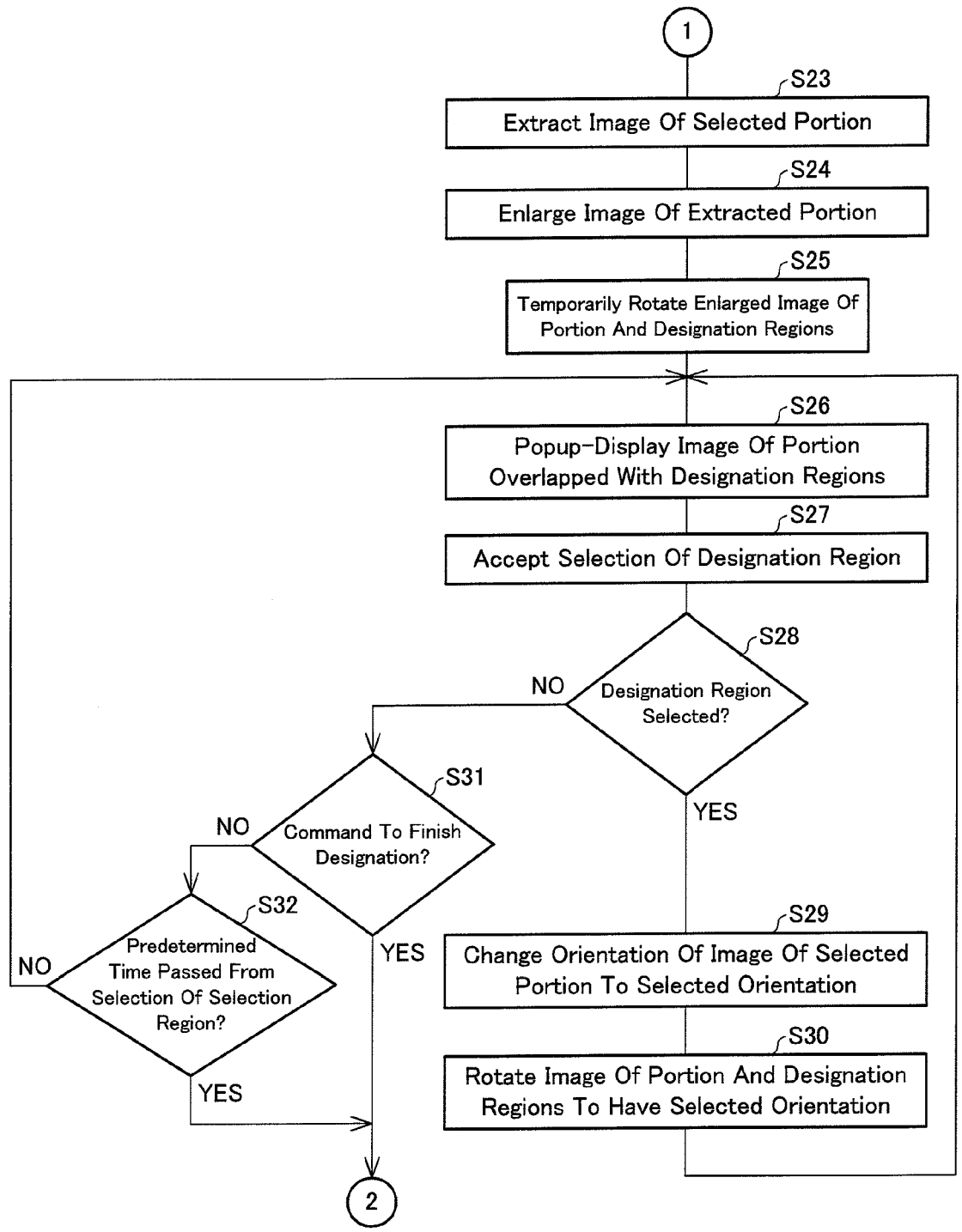
FIG. 12 is a flowchart showing the image processing apparatus 1's operation subsequent to the operation shown in FIG. 11.

The following explains an operation of the image processing apparatus 1 of an embodiment of the present invention with reference to FIGS. 11 and 12. FIG. 11 is a flowchart showing an operation of the image forming apparatus 1 shown in FIG. 1. FIG. 12 is a flowchart showing the image processing apparatus 1's operation subsequent to the operation shown in FIG. 11.

In the image processing apparatus 1, input image data is stored in the storage device 3 (S11). The input image data is image data of a document read by an image reading apparatus for example.

Subsequently, the division section 11 reads out the input image data from the storage device 3 and divides the image data into a plurality of portions (S12).

Subsequently, the orientation determining section 12 calculates reliabilities of first to fourth directions (0 degree direction, 90 degree direction, 180 degree direction, and 270 degree direction) as orientations of individual portions (S13). Subsequently, with respect to each of the portions, the direction regarded as having the highest reliability as an orientation of the portion is stored as an orientation of the portion (S14).

Subsequently, the display control section 14 determines whether the input image data includes a portion with low reliability, i.e. determines whether the input image data includes a portion whose reliability of orientation (direction regarded as having the highest reliability as an orientation of the portion) is less than a predetermined threshold value or not (S15).

As a result of the determination, when the input image data includes a portion (target portion) whose reliability of orientation is less than the predetermined threshold value, the display control section 14 generates the designation regions (touch areas) 32 and the selection region (touch area) 31 for the target portion (S16). Note that if a plurality of target portions exist, the designation regions 32 and the selection region 31 are generated with respect to each of the target portions.

Subsequently, the display control section 14 reads out, from the storage device 3, input image data to be preview-displayed (S17), and downsamples the input image data in order to preview-display the input image data (S18).

Subsequently, the display control section 14 causes the selection region 31 and the designation regions 32 to overlap a target portion in the downsampled input image data, and outputs the input image data as image data for preview-display to the display device 2. Receiving the image data, the display device 2 makes preview-display (S19).

While in the preview-display, the display device 2 accepts selection made on the selection region 31 (S20). In this case, the display control section 14 may cause the display device 2 to display that selection made on the selection region 31 will cause a target portion corresponding to the selection region 31 to be popup-displayed.

Subsequently, if a selection input is not made on the selection region 31 (S21), and if an input to one of the designation regions 32 is made in order to designate the orientation of each of all target portions (S22), then the process is finished.

On the other hand, if a selection input is made on the selection region 31 set to the target portion in S21, the display control section 14 extracts the target portion corresponding to the selected selection region 31 from input image data (e.g. the downsampled image data) (S23, FIG. 12). Subsequently, the display control section 14 enlarges the extracted target portion (S24), and temporarily rotates the enlarged target portion and the designation regions 32 (S25). The temporal rotation is, as described above, a process for rotating the target portion in accordance with the orientation determined by the orientation determining section 12.

Subsequently, the display control section 14 outputs, as image data for popup-display, the target portion and the designation regions 32 that are processed in S25 to the display device 2. Consequently, the display device 2 popup-displays the target portion and the designation regions 32 (S26). Note that a series of processes for popup-display are not necessarily required to have the user's input on the selection region 31 (without going through the processes of S20 and S21), but may be automatically performed when carrying out the preview-display of the target portion in S19. While in the popup-display, the display device 2 accepts selection of the designation regions 32 (S27). In this case, the display control section 14 may cause the display device 2 to display a message for urging a user to designate the orientation of an image from one of the designation regions 32.

Subsequently, when the user selects one of the designation regions 32 surrounding the target portion (S28), the display control section 14 changes the orientation of the surrounded target portion to the orientation designated by the user from the selection of one of the designation regions 32 (S29).

Subsequently, the display control section 14 rotates the target portion and the designation regions 32 in accordance with the orientation designated by the user from the selection of one of the designation regions 32 (S30), and goes back to the process of S26. Consequently, the display device 2 popup-displays the target portion in such a manner that the target portion is rotated to have the orientation designated by the user from selection of one of the designation regions 32.

On the other hand, in S28, while any of the designation regions 32 surrounding the target portion is not selected by the user, if an instruction to finish the popup-display is made by the user (S31), the process goes back to S20 and gets in a state of waiting for selection of the selection region 31.

While any of the designation regions 32 surrounding the target portion is not selected by the user in S28 and while an instruction to finish the popup-display is not made by the user in S31, when a predetermined time passes from a time when a selection input is made on the selection region 31 in S21 (S32), the process goes back to S20 and gets in a state of waiting for selection of the selection region 31. Note that if the predetermined time does not pass from the time when a selection input is made on the selection region 31 in S21, the processes of S26, S27, S28, S31, and S32 are repeated.

As described above, even if input image data includes a portion whose reliability of orientation is low (target portion) and a portion whose reliability of orientation is high (non-target portion) coexist (e.g. PDF data), the image processing apparatus 1 of the present embodiment allows correct character recognition of the portions in accordance with their respective appropriate orientations. Further, the target portion and the non-target portion are subjected to different procedures in order to carry out character recognition in accordance with an appropriate orientation. Accordingly, it is possible to carry out character recognition with high accuracy with respect to whole input image data while reducing a time necessary for processes up to the character recognition process.

The method for determining whether the preview-display is necessary or not is not limited to the first method explained above, and other methods explained below may also be used.

(1-2) Second Method for Determining Whether Preview-Display is Necessary or not

The preview-necessity determining section 21 acquires the reliabilities of orientations of individual portions that are determined by the orientation determining section 12, and calculates, with respect to each of the portions, a ratio of a reliability R1 which is the reliability of an orientation with the highest reliability to a reliability R2 which is the reliability of an orientation with the second-highest reliability (R1/R2). Then, the preview-necessity determining section 21 compares the ratios (R1/R2) of the portions with a predetermined threshold value Tc (e.g. Tc=2). As a result of the comparison, the preview-necessity determining section 21 considers a portion whose ratio (R1/R2) is not more than the predetermined threshold value Tc (target portion) as requiring the preview-display, and considers a portion whose ratio (R1/R2) is more than the predetermined threshold value Tc as not requiring the preview-display.

(1-3) Third Method for Determining Whether Preview-Display is Necessary or not

The preview-necessity determining section 21 acquires the reliabilities of orientations of individual portions which reliabilities are determined by the orientation determining section 12, and compares a reliability R1 which is the reliability of an orientation with the highest reliability with a predetermined threshold value Ta (e.g. Ta=70) with respect to each of the portions. Further, the preview-necessity determining section 21 calculates, with respect to each of the portions, a ratio of a reliability R1 which is the reliability of an orientation with the highest reliability to a reliability R2 which is the reliability of an orientation with the second-highest reliability (R1/R2), and compares the ratio (R1/R2) with a predetermined threshold value Tc (e.g. TC=2). As a result of the comparison, the preview-necessity determining section 21 considers a portion whose reliability R1 is not more than the predetermined threshold value Ta and whose ratio (R1/R2) is not more than the predetermined threshold value Tc as requiring the preview-display, and considers a portion whose reliability R1 is more than the predetermined threshold value Ta or whose ratio (R1/R2) is more than the predetermined threshold value Tc as not requiring the preview-display.

The display examples of a square frame for a portion are not limited to the first display example explained above and include other display examples explained below.

(2-2) Second Display Example of Square Frame for Portion

Figure 13:
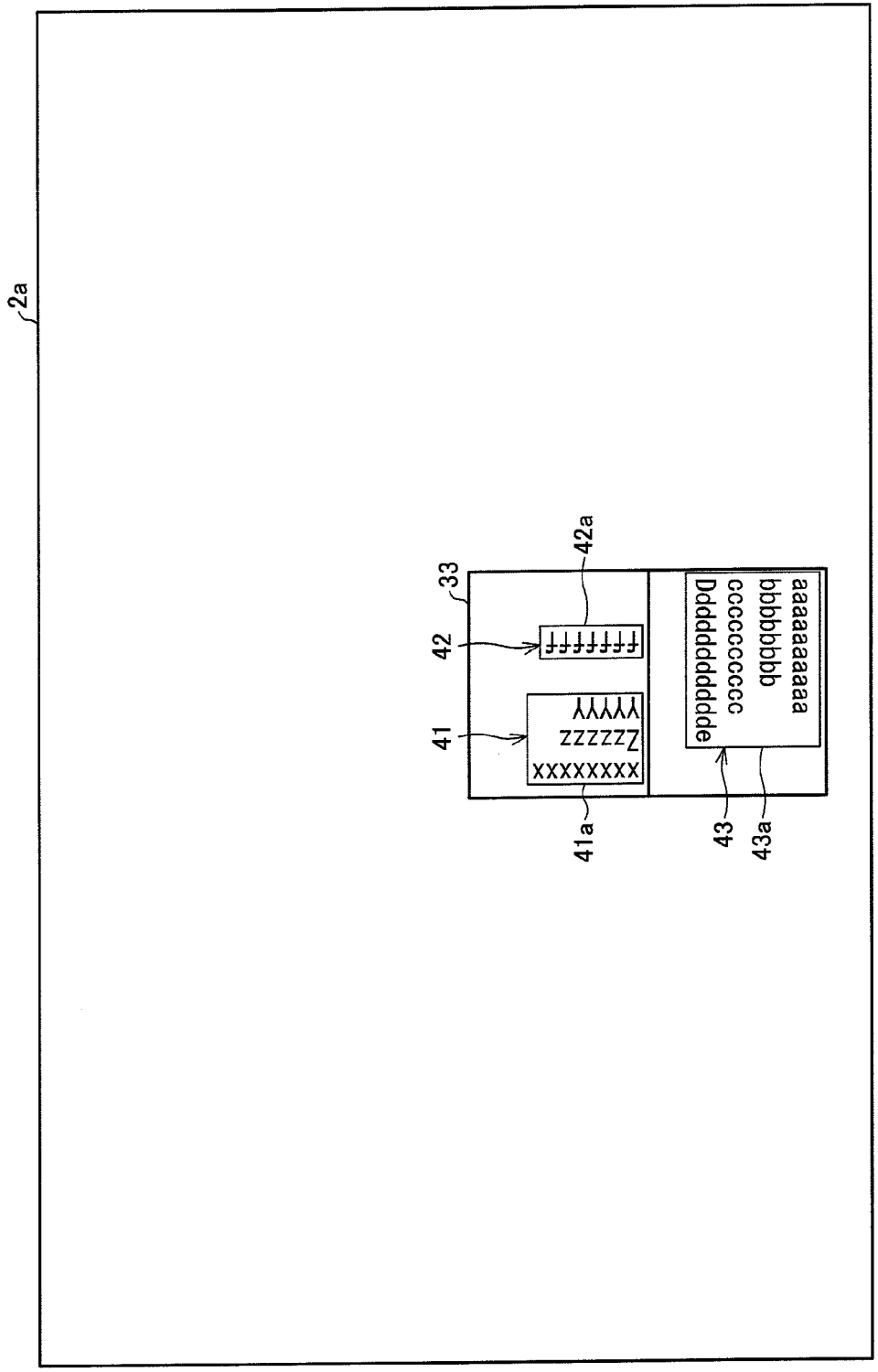
FIG. 13 is an explanatory drawing showing an example in which square frames surrounding individual portions are displayed with different colors depending on the reliabilities of orientations of the portions in a preview-image displayed by the display device shown in FIG. 1.

In a case of preview-displaying not only a target portion but also all portions, individual portions may be displayed with different colors depending on the reliabilities of orientations of the portions. For example, square frames respectively surrounding the portions are displayed with different colors. FIG. 13 is an explanatory drawing showing an example in which square frames respectively surrounding portions are displayed with different colors depending on the reliabilities of orientations of the portions in a preview-image 33 displayed by the display device 2. In FIG. 13, a square frame 43a for a third portion 43 having an orientation of the highest reliability is displayed with a low-density color (pale color), a square frame 41a for a first portion 41 having an orientation of the second-highest reliability is displayed with an intermediate-density color, and a square frame 42a for a second portion 42 having an orientation of the third-highest reliability is displayed with a high-density color (thick color). The square frames 41a to 43a may be considered as serving in the same manner as the designation regions 32.

(2-3) Second Display Example of Square Frame for Portion

Figure 14:
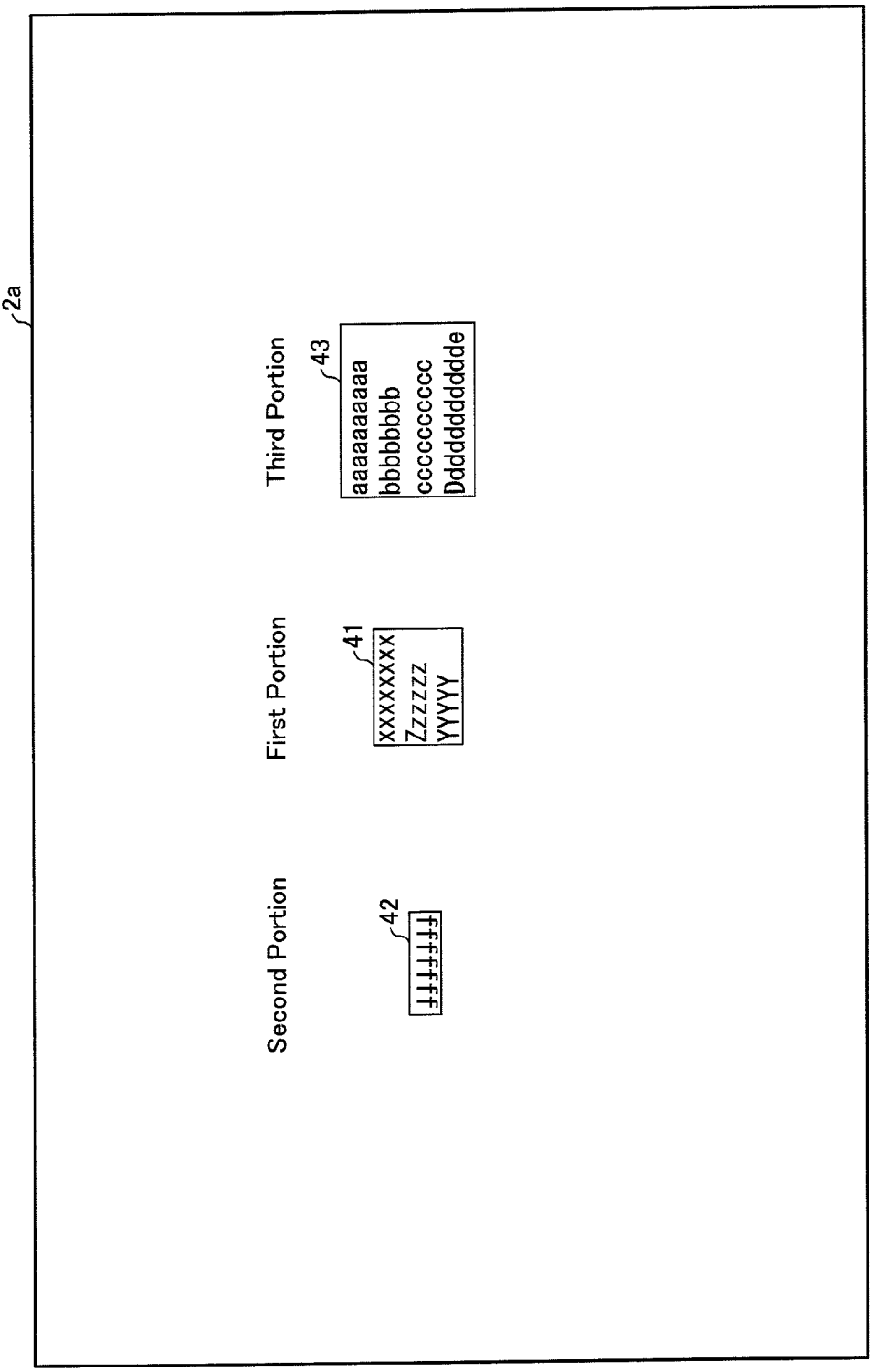
FIG. 14 is an explanatory drawing showing a state where portions are positioned according to the order of their reliabilities of orientation in the preview-image displayed by the display device shown in FIG. 1.

In a case of preview-displaying not only a target portion but also all portions, the portions may be positioned according to the order of reliabilities of orientations of the portions. FIG. 14 is an explanatory drawing showing a state where portions are positioned according to the order of their reliabilities of orientations in the preview-image 33 displayed by the display device 2. In the example shown in FIG. 14, the first to third portions 41 to 43 are positioned in such a manner that the portion having an orientation with the lowest reliability is positioned at the left end and the portion having an orientation with higher reliability is positioned at its right side. The square frames 41a to 43a may be considered as serving in the same manner as the designation regions 32.

Further, examples of the popup display include not only the first example explained above but also other examples explained below.

(3-2) Second Example of Popup-Display

In the example of (3-1), a user's operation on the selection region 31 serving as a touch panel or the designation regions 32 serving as a touch panel on the target portion causes the target portion (selection region 31) to be popup-displayed. On the other hand, the target portion may be popup-displayed as a preview-image in such a manner that the target portion is directly popup-displayed as shown in FIG. 9 without going through a display state shown in FIG. 8.

(3-3) Third Example of Popup-Display

In the popup-display shown in FIG. 9, the target portion (selection region 31) is displayed in such a manner that the target portion is rotated in accordance with the orientation determined by the orientation determining section 12. On the other hand, the target portion (selection region 31) may be displayed in such a manner that the target portion is not rotated in accordance with the orientation determined by the orientation determining section 12, i.e. the target portion may be displayed with its orientation being the orientation of the second portion 42 in image data.

(3-4) Fourth Example of Popup-Display

In the popup-display shown in FIG. 9 for example, four designation regions 32 positioned to form a square frame surrounding the target portion (selection region 31) are displayed. In this example, the designation regions 32 are displayed with different display densities or different display colors depending on the reliabilities of orientations of the target portion.

Figure 15A:
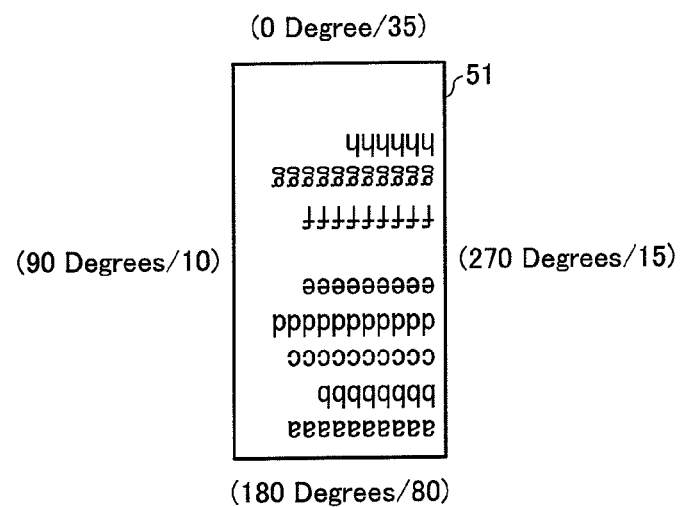
FIG. 15(a) is an explanatory drawing showing the relation between four orientations of a portion preview-displayed by the display device shown in FIG. 1 and the reliabilities of the respective orientations.
Figure 15B:
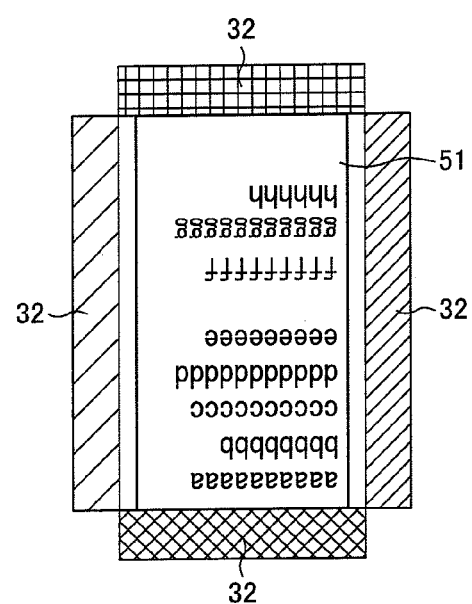
FIG. 15(b) is an explanatory drawing showing a state where densities or colors of the designation regions are made different according to the reliabilities of the respective orientations in the popup-displayed portion in FIG. 15(a).

FIG. 15(a) is an explanatory drawing showing the relation between four orientations of a portion preview-displayed by the display device 2 and the reliabilities of the respective orientations. FIG. 15(b) is an explanatory drawing showing a state where densities or colors of the designation regions 32 are made different according to the reliabilities of the respective orientations in the popup-displayed portion in FIG. 15(a).

In a portion 51 shown in FIG. 15(a), the relation between the orientations and the respective reliabilities of the orientations in a counterclockwise order is as follows: 0 degrees/35, 90 degrees/10, 180 degrees/80, and 270 degrees/15. In the popup-display shown in FIG. 15(b), the portion 51 is displayed in such a manner that the designation region 32 corresponding to the orientation with the lowest reliability is displayed with lowest density (palest color) and the designation region 32 corresponding to the orientation with higher reliability is displayed with higher density (thicker color).

FIG. 16(a) is an explanatory drawing showing an example of the colors of the designation regions 32 with the highest reliability to the fourth-highest reliability in a case where the densities (colors) of the designation regions 32 are changed in the order of the reliability of an orientation. FIG. 16(b) is an explanatory drawing showing values of R (R1-R4) shown in FIG. 16(a). FIG. 16(c) is an explanatory drawing showing another manner for determining R (R1-R4) shown in FIG. 16(a).

In the portion 51 shown in FIG. 15(a), the order of reliabilities of orientations are such that an orientation of 180 degrees has the highest reliability, an orientation of 0 degree has the second highest reliability, an orientation of 270 degrees has the third highest reliability, and an orientation of 90 degrees has the fourth highest reliability. In the example shown in FIG. 16(a), RGB colors indicative of the colors of the designation regions 32 are determined in such a manner that G and B have constant values of 0 and 127, respectively, and the density of R is changed. Further, in the example of FIG. 16(b), density is lowered from R1 to R4. Consequently, the colors of the designation regions 32 are such that the color of the designation region 32 corresponding to the orientation of 180 degrees having the highest reliability is densest and the colors of the designation regions 32 corresponding to the orientations of 0 degree, 270 degrees, and 90 degrees having the second-highest, the third-highest, and the fourth-highest reliabilities, respectively, are paler in this order. It should be noted that the density (color) of the designation region 32 is determined not by the value of the reliability but by the order of the reliability.

In the example shown in FIG. 16(c), the reliability of the orientation with the highest reliability is regarded as a reference, a ratio C of the reliability of other orientation to the reference is calculated, and the densities (colors) of the designation regions 32 corresponding individual orientations are determined using the ratio C.

(3-5) Fifth Example of Popup-Display

In this example, the display size of the four designation regions 32 respectively corresponding to the orientations in the popup-display shown in FIG. 9 is changed according to the reliabilities of the orientations in the target portion 51.

Figure 17:
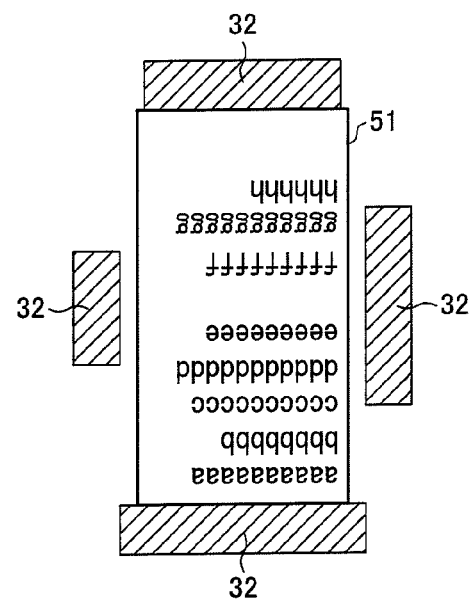
FIG. 17 is an explanatory drawing showing a state where the size of the designation regions are changed according to the reliabilities of the orientations in the popup-display of the portion shown in FIG. 9.

FIG. 17 is an explanatory drawing showing a state where the size of the designation regions 32 are changed according to the reliabilities of the orientations in the popup-display of the portion shown in FIG. 9. In this example, the lengths of the designation regions 32 having rectangular shapes are changed.

Assume that the relations between the orientations and the reliabilities in the portion 51 shown in FIG. 17 are 0 degree/35, 90 degrees/10, 180 degrees/80, and 270 degrees/15 in the order of a counterclockwise direction. In the popup-display of the portion 51 shown in FIG. 17, the designation region 3 corresponding to the orientation with the lowest reliability has the shortest length and the designation region 3 corresponding to the orientation with a higher reliability has a longer length.

FIG. 18(a) is an explanatory drawing showing an example of the size (length) of the designation regions 32 with the highest reliability to the fourth-highest reliability in a case where the size (length) of the four designation regions corresponding to the four orientations are changed according to the order of reliabilities of the orientations. FIG. 18(b) is an explanatory drawing showing values (magnifications) of M (M1 to M4) shown in FIG. 18(a). FIG. 18(c) is an explanatory drawing showing another manner for determining the values of M (M1 to M4) shown in FIG. 18(a). FIG. 18(d) is an explanatory drawing showing how to determine the values of magnifications (C1 to C4) according to the reliabilities shown in FIG. 18(c).

In the portion 51 shown in FIG. 15(a), the order of the reliabilities of individual orientations is such that an orientation of 180 degrees has the highest reliability, an orientation of 0 degree has the second-highest reliability, an orientation of 270 degrees has the third highest-reliability, and an orientation of 90 degrees has the fourth-highest reliability. In the example shown in FIG. 18(a), the size (length) of the designation region 32 is determined by multiplying the reference size (e.g. maximum size) of the designation region 32 with the magnification M. As shown in FIG. 18(b), the magnification M is larger as the reliability of the orientation is higher. Consequently, the size (length) of the designation regions 32 are such that the size (length) of the designation region 32 corresponding to the orientation of 180 degrees having the highest reliability is largest (longest) and the size (length) of the designation regions 32 corresponding to the orientations of 0 degree, 270 degrees, and 90 degrees having the second-highest, the third-highest, and the fourth-highest reliabilities, respectively, are smaller (shorter) in this order. It should be noted that the size of the designation region 32 is determined not by the value of the reliability but by the order of the reliability.

In the example shown in FIG. 18(c), the magnification M (M1-M4) is a value C (C1-C4) corresponding to the reliability. That is, as shown in FIG. 18(d), the magnification M to be multiplied with the reference size of the designation region 32 in order to calculate the size (length) of the designation region 32 is a ratio of the reliability of the orientation with the highest reliability to the reliability of other orientation.

Embodiment 2

Figure 19:
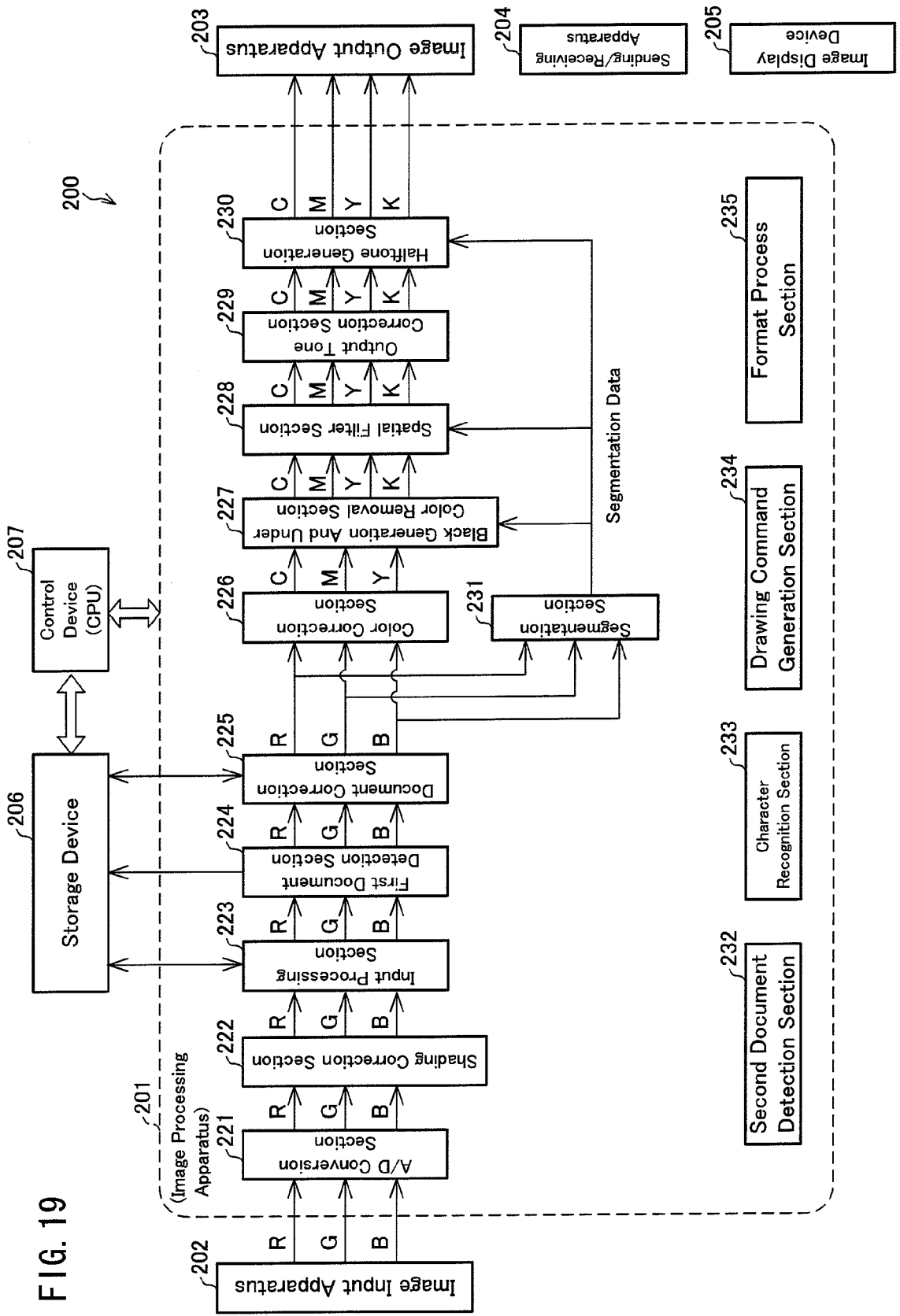
FIG. 19 is a block diagram illustrating how a printing operation is carried out in an image forming apparatus in accordance with an embodiment of the present invention.
Figure 20:
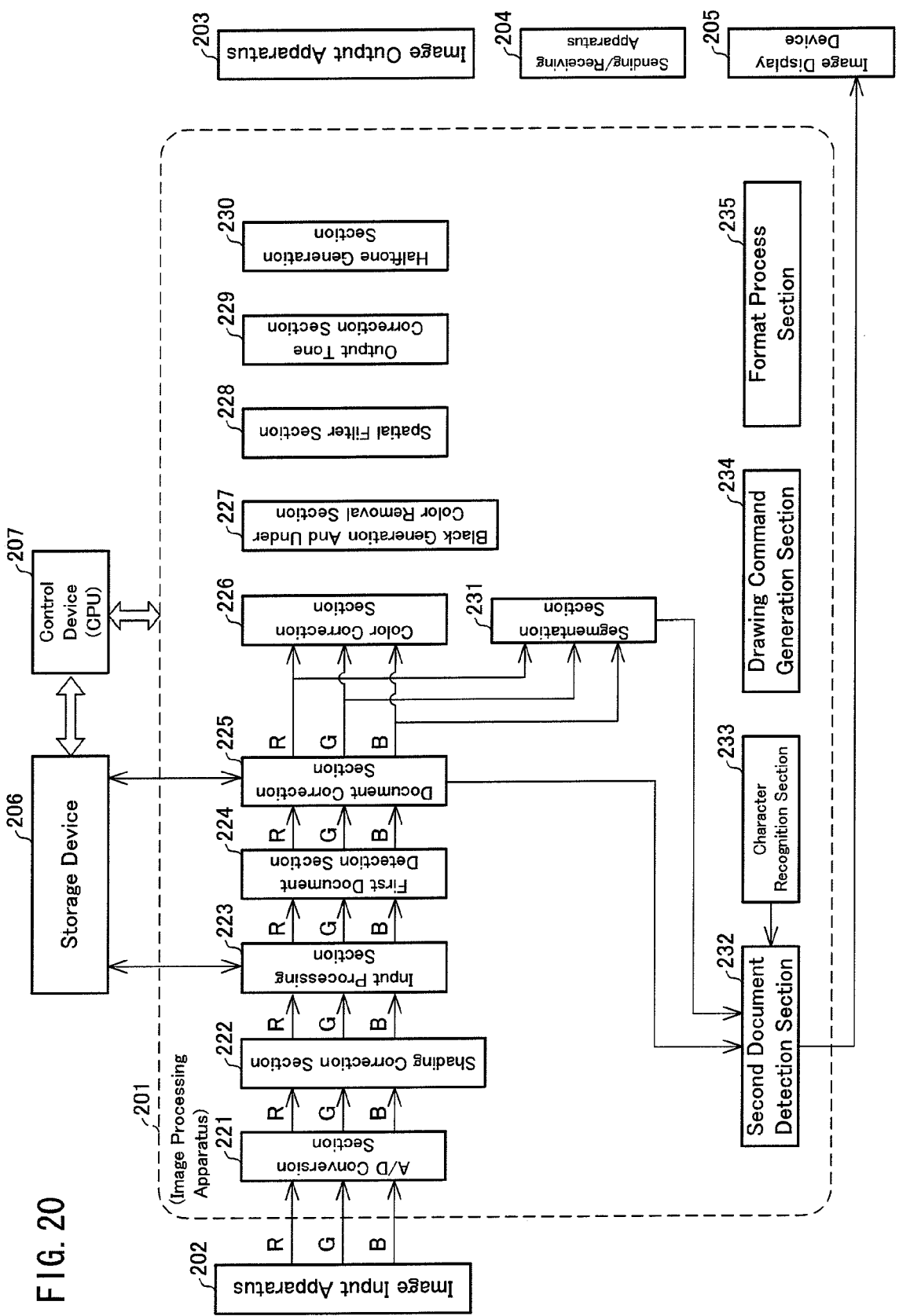
FIG. 20 is a block diagram illustrating how a preview display is carried out in an image forming apparatus in accordance with an embodiment of the present invention.
Figure 21:
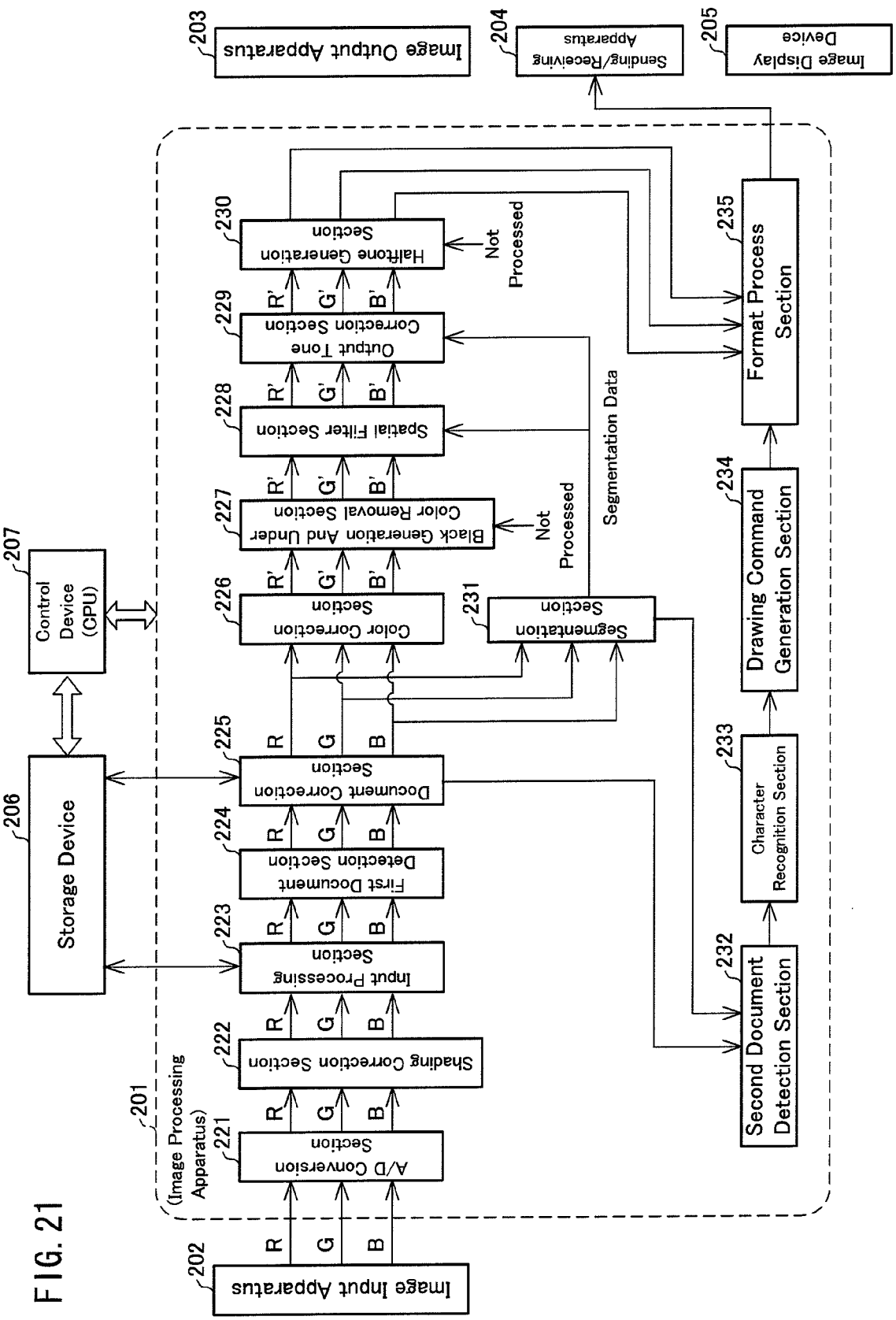
FIG. 21 is a block diagram illustrating how an image is transmitted in an image forming apparatus in accordance with an embodiment of the present invention.

Another embodiment of the present invention is described below with reference to the drawings. The present embodiment is an exemplary image forming apparatus, serving as a multifunction printer, which employs the image processing apparatus 1 of FIG. 1. FIG. 19 is a block diagram illustrating how a printing operation is carried out in an image forming apparatus 200. FIG. 20 is a block diagram illustrating how a preview display is carried out in the image forming apparatus 200. FIG. 21 is a block diagram illustrating how an image is transmitted in the image forming apparatus 200.

The image forming apparatus 200 of the present embodiment is a digital color multifunction printer having functions such as a copying function (a copy mode), a printing function (a printer mode), a facsimile sending/receiving function (a facsimile sending mode and a facsimile receiving mode), and a scan to e-mail function (a scan to e-mail mode).

The copy mode is for reading image data of a document and then printing out an image of the image data onto a paper sheet. The printer mode is for printing out an image of image data which is transmitted from a terminal device connected to the image forming apparatus 200. The facsimile sending mode is for reading image data of a document and then sending out the image data to an external device via the telephone line. The facsimile receiving mode is for externally receiving image data via a facsimile and then printing out an image of the received image data onto a paper sheet. The scan-to-email mode is for scanning a document so as to obtain image data, attaching the image data to an email, and then sending the email to a specified address. Note that an image output apparatus (printing apparatus) used here is an apparatus, for reproducing an image, such as an electrophotographic printer or an ink jet printer.

The image forming apparatus includes, for example, an image processing apparatus 201, an image input apparatus 202, an image output apparatus 203, a sending/receiving apparatus 204, an image display device 205, a storage device 206, and a control device 207 (see FIG. 19).

The image input apparatus 202 includes a CCD (Charge Coupled Device) line sensor, and carries out scanning of a document. Specifically, the image input apparatus 202 emits light toward the document, and converts an optical image reflected by the document into R (red), G (green), and B (blue) analog signals. The image processing apparatus 201 carries out an image process on the analog signals (image data) supplied from the image input apparatus 202. The image output apparatus 203 is for example the electrophotographic printer or the ink jet printer, and prints out, onto a paper sheet, an image of the image data supplied from the image processing apparatus 201. The sending/receiving apparatus 204 is connected with the telephone line or the Internet, and sends/receives image data to/from the external device. The image display apparatus 205 is for example a liquid crystal display employing a touch panel, and is included in an operation panel (not illustrated) of the image forming apparatus 200. The image display apparatus 205 is capable of a color display. The image display apparatus 205 corresponds to the display apparatus 2 of FIG. 1.

The storage device 206 corresponds to the storage device 3 of FIG. 1. The control device 207 is a computer including a CPU, and controls an overall system involving (i) various hardware devices included in the image forming apparatus 200 and (ii) data transmission among the hardware devices. The control device 207 has an additional function of controlling the sections included in the image forming apparatus 200.

The image processing apparatus 201 includes an A/D (analog/digital) conversion section 221, a shading correction section 222, an input processing section 223, a first document detection section 224, a color correction section 226, a black generation and under color removal section 227, a spatial filter section 228, an output tone correction section 229, a halftone generation section 230 and a segmentation process section 231, a second document detection section 232, a character recognition section 233, a drawing command generation section 234, and a format process section 235.

The A/D conversion section 221 converts the image data (analog RGB image signals), which is supplied from the image input apparatus 202, into digital RGB image data. The shading correction section 222 removes, from the digital RGB image data (hereinafter referred to merely as image data) supplied from the A/D conversion section 222, various distortions which have occurred in a lighting system, an image focusing system, and an image sensing system of the image input apparatus 202. The input processing section 223 carries out a gamma correction process for each of R, G, and B image data supplied from the shading correction section 222.

The first document detection section 224 detects document skew by analyzing the image data which has been processed in the input processing section 223. The document correction section 225 corrects the document skew of the image data according to the result of the above document skew detection carried out by the first document detection section 224.

The color correction section 226 converts the image data (RGB image data), which is supplied from the document correction section 225, into CMY image data, and carries out a process of improving color reproduction of the CMY image data.

The black generation and under color removal section 227 generates black (K) image data from the CMY image data which is supplied from the color correction section 226, so that new CMY image data is generated as a result of the removal of the black (K) image data from the CMY image data supplied from the color correction section 226.

The spatial filter section 228 processes the CMYK image data supplied from the black generation and under color removal section 227 in such a way that the CMYK image data is subjected to a spatial filter process (e.g., an edge enhancement process and a smoothing process). The spatial filter process is carried out based on a segmentation class signal.

The output tone correction section 229 corrects gamma characteristics of the CMYK image data (hereinafter referred to merely as image data), which is supplied from the spatial filter section 228, so that an image of the image data is appropriately outputted to a recording medium such as a paper sheet.

The halftone generation section 230 processes the image data, which is supplied from the output tone correction section 229, in such a way that the image data is subjected to a tone reproduction process (a halftone generation process) required for the image to be printed out by the image outputting apparatus 203. The tone reproduction process is carried out by an error diffusion method or a dither method.

The segmentation section 231 judges which region each pixel of the image data (RGB image data) supplied from the document correction section 225 belongs to. The regions are for example a black text region, a color text region, and a halftone dot region. Then, the segmentation section 231 generates the segmentation class signal indicative of the result of the judgment. The segmentation class signal is supplied to the black generation and under color removal section 227, the spatial filter section 228, and the halftone generation section 230.

The second document detection section 232 has functions corresponding to those of the division section 11, the orientation determining section 12, and the display control section 14 of FIG. 1.

The character recognition section 233 corresponds to the character recognition section 13 of FIG. 1, and has the same function as that of the character recognition section 13.

The drawing command generation section 234 inserts, into the image data, a transparent text indicative of the result of the character recognition carried out by the character recognition section 233.

The format process section 235 converts the supplied image data into a general-purpose format (file format) that is processable in an external device.

Figure 22:
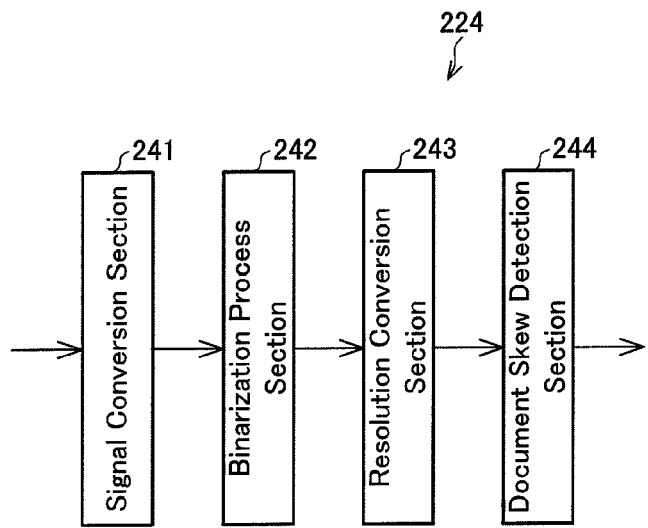
FIG. 22 is a block diagram illustrating a configuration of the first document detection section shown in FIG. 19.

FIG. 22 is a block diagram illustrating a configuration of the first document detection section 224. As illustrated in FIG. 22, the first document detection section 224 includes a signal conversion section 241, a binarization process section 242, a resolution conversion section 243, and a document skew detection section 244.

The signal conversion section 241 converts the image data (RGB color image data) into luminance signals through the following calculation.

$Yi = 0.30Ri + 0.59Gi + 0.11Bi$ where Y represents a luminance signal of each pixel; R, G, and B each represent a value of a color component of each pixel; and a suffix i represents a value provided for each pixel (i is an integer equal to or greater than 1).

Here, the signal conversion section 241 can convert the RGB color image data (RGB signals) into a CIE1976L*a*b* signal (CIE stands for Commission International de l'Eclairage, L* represents brightness, and a* and b* each represent chromaticity). Alternatively, the signal conversion section 241 can convert the RGB signal into a G signal.

The binarization process section 242 binarizes the image data supplied from the signal conversion section 241. In a case where the image data is 8-bit data, a threshold value is for example 128. Alternatively, the threshold value is a mean value of density (pixel values) of a plurality of (e.g., 5×5) pixels constituting each block.

The resolution conversion section 243 reduces resolution of the image data which has been binarized by the binarization process section 242. For example, the resolution conversion section 243 converts the image data, which has been obtained as 1200 dpi image data or 600 dpi image data, into 300 dpi image data. The conversion of the resolution is carried out by a commonly known method such as a nearest neighbor method, a bilinear method, or a bicubic method.

The document skew detection section 244 carries out the document skew detection by, for example, a method disclosed in Japanese Patent Application Publication, Tokukaihei, No. 7-192086 A (Patent Literature 4). The document skew detection is carried out so as to correct skew of a read image of a document, which is placed on the image input apparatus 202 (serving as a scanner) so that an image of the document is read into the image input apparatus 202. The skew detection here is carried out in the following manner.

(c1) First, a plurality of boundary points between black pixels and white pixels are extracted from the image data which has been binarized by the binarization process section 242. Then, coordinate data of a dot sequence made up of the boundary points is found. Here, each of the boundary points between the black pixels and the white pixels is for example a boundary point between black and white located at an upper end of each character. Coordinates of the boundary points are found and then stored in the storage device 206.

(c2) A regression line is found from the dot sequence coordinate data consisting of the coordinates of a number of boundary points, which have been found in the process (c1). Then, a regression coefficient b of the regression line is found through the following equation (1) and stored in the memory.

$$b = \frac{Sxy}{Sx} \quad (1)$$

In the equation (1), Sx and Sy are the residual sum of squares of a variable x and the residual sum of squares of a variable y, respectively, and Sxy is the sum of products of the residual error of x and the residual error of y. That is, Sx, Sy, and Sxy are represented by the following equations (2) through (4), respectively:

$$Sx = \sum_{i=1}^{n}(x_i - x)^2 = \sum_{i=1}^{n}x_i^2 - \left(\sum_{i=1}^{n}x_i\right)^2 / n \quad (2)$$

$$Sy = \sum_{i=1}^{n}(y_i - y)^2 = \sum_{i=1}^{n}y_i^2 - \left(\sum_{i=1}^{n}y_i\right)^2 / n \quad (3)$$

$$Sxy = \sum_{i=1}^{n}(x_i - x)(y_i - y) = \sum_{i=1}^{n}x_iy_i - \left(\sum_{i=1}^{n}x_i\right)\left(\sum_{i=1}^{n}y_i\right) / n \quad (4)$$

Next, a skew angle (θ) of an image of the image data is found from the regression coefficient b, through the following equation (5):

$$\tan\theta = b \quad (5)$$

The document correction section 225 supplies, to the second document detection section 232, the 300 dpi image data whose document skew has been corrected. Since the division section 11 included in the second document detection section 232 needs to recognize only an approximate layout of the document, the resolution conversion section 243 can generate (i) 75 dpi image data for the second document detection section 232 and (ii) 300 dpi image data for the character recognition section 233.

The document correction section 225 corrects, as described earlier, the document skew of the image data according to the result of the document skew detection carried out by the first document detection section 224.

In a case where the image data is corrected so that it is rotated counterclockwise by an angle θ on its origin, a relation between (i) coordinates before the correction and (ii) coordinates after the correction is represented by the following equation (6). The document skew correction is carried out by using the equation (6).

$$\begin{pmatrix} X' \\ Y' \end{pmatrix} = \begin{pmatrix} \cos\theta & -\sin\theta \\ \sin\theta & \cos\theta \end{pmatrix} \begin{pmatrix} X \\ Y \end{pmatrix} \quad (6)$$

In the equation (6), (X, Y) represent the coordinates before the correction, and (X', Y') represent the coordinates after the correction.

For example, in cases where the image data is rotated counterclockwise on its origin by (i) 90 degrees, (ii) 180 degrees, and (iii) 270 degrees, the relation of (a) the coordinates before the correction and (b) the coordinates after the correction is represented by each of the following equations.

Figure 23:
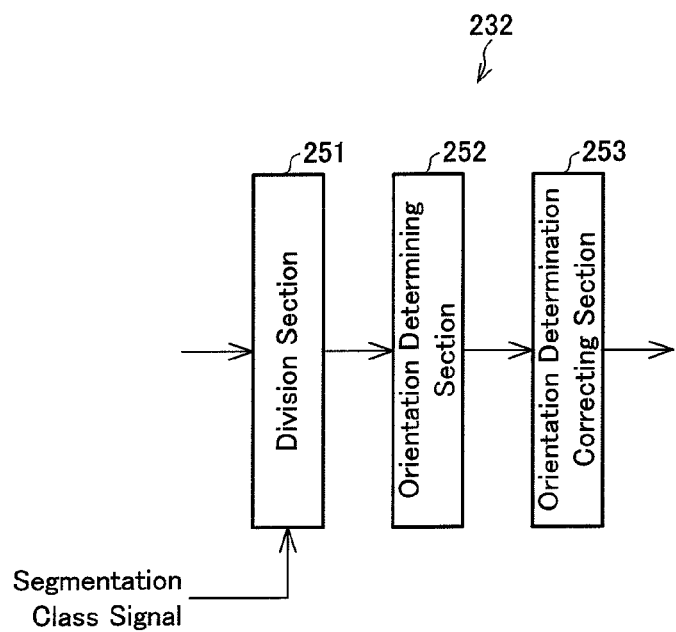
FIG. 23 is a block diagram illustrating a configuration of the second document detection section shown in FIG. 19.

Let the coordinates before the correction be (X, Y), and the coordinates after the correction be (X', Y').
When the image data is rotated by 90 degrees:
X'=a width of an original image in a Y direction −1−Y Y'=X
When the image data is rotated by 180 degrees:
X'=a width of the original image in an X direction −1−X
Y'=a width of the original image in the Y direction −1−Y
When the image data is rotated by 270 degrees:
X'=Y
Y'=a width of the original image in the X direction −1−X FIG. 23 is a block diagram illustrating a configuration of the second document detection section 232. The second document detection section 232 includes a division section 251, an orientation determining section 252, and an orientation determination correcting section 253. The division section 251 corresponds to the division section 11 of FIG. 1, and has the same function as that of the division section 11. The orientation determining section 252 corresponds to the orientation determining section 12 of FIG. 1, and has the same function as that of the orientation determining section 12. The orientation determination correcting section 253 rotates binary image data supplied from the orientation determining section 252 in 90-degree units. By what degree the image data is to be rotated is determined according to the result of orientation determination carried out by the orientation determining section 252.

The following description discusses how a printing operation is carried out in the above image forming apparatus 200 in the copy mode (see FIG. 19). First, the image input apparatus 202 reads an image of a document so as to obtain analog color image signals (RGB analog signals), and then supplies them to the image processing apparatus 201. The analog color image signals are converted into digital signals by the A/D conversion section 221, and then subjected to shading correction in the shading correction section 222 so that various distortions which have occurred in a lighting system, an image focusing system, and an image sensing system of the image input apparatus 202 are removed from the color image signals. Thereafter, each of the RGB signals is subjected to a process, in the input processing section 223, such as a gamma correction process. Then, the color image signals (image data) which have been processed in the input processing section 223 are temporarily stored in the storage device 206.

Next, the first document detection section 224 detects document skew of the image data stored in the storage device 206. Then, the document correction section 225 corrects the document skew of the image data according to the result of the above document skew detection carried out by the first document detection section 224.

The image data which has been processed by the document correction section 225 can be managed in the form of filing data. In this case, the image data is stored in the form of a JPEG code, which has been compressed in accordance with for example a JPEG compression algorithm.

The JPEG code is read out from the storage device 206 upon receiving an instruction of carrying out a copy output operation or a print output operation, and then converted into RGB data through a decoding process carried out by a JPEG decode section (not illustrated). On the other hand, upon receiving an instruction of carrying out an image sending operation, the JEPG code is read out from the storage device 206 so as to be sent out to an external connection device or a communication line over the network or the communication line. The above management of the filing data and the operation of data transmission are controlled by the control device 207.

The color correction section 226 generates a CMY (C: Cyan, M: Magenta, and Y: Yellow) signal indicative of complimentary colors of the RGB. The color correction section 226 also improves color reproduction of the CMY signal. Then, the black generation and under color removal section 227 converts the CMY signal into a CMYK (K: black) signal indicative of four colors. The spatial filter section 228 processes the CMYK signal so that the CMYK signal is subjected to an edge enhancement process and a smoothing process. The output tone correction section 229 corrects gamma characteristics of the CMYK signal so that an image indicated by the CMYK signal is appropriately outputted to a recording medium such as a paper sheet. The halftone generation section 230 processes the CMYK signal so that the CMYK signal is subjected to a tone reproducing process suitable for an image to be outputted. The CMYK signal is supplied from the halftone generation section 230 to the image output apparatus 203, where a visible image indicated by the CMYK signal is printed out onto the paper sheet.

Figure 24A:
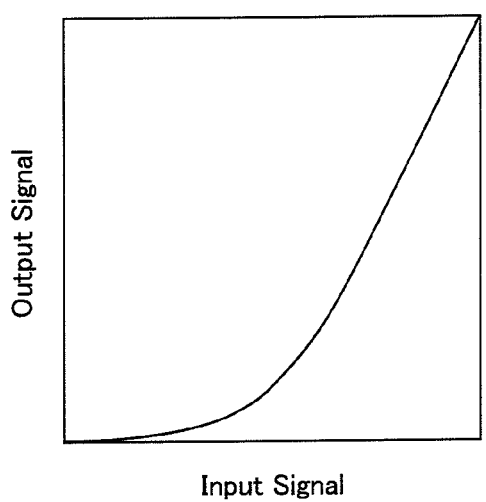
FIG. 24(a) is a graph illustrating an exemplary gamma correction curve used when gamma correction suitable for a display characteristic of a display device is carried out.
Figure 24B:
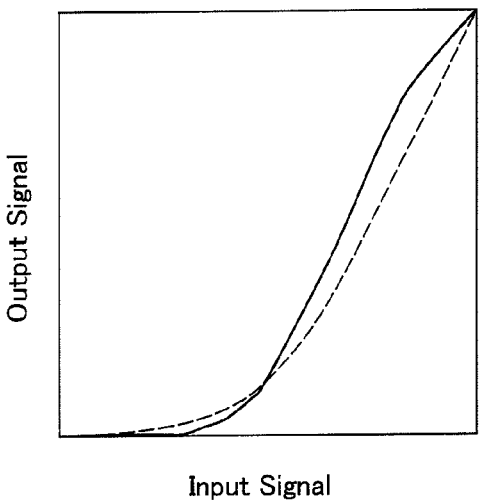
FIG. 24(b) is a graph illustrating an exemplary gamma correction curve used when gamma correction for enhancing a contrast between a character and a background is carried out.

The following description discusses the gamma correction carried out by the output tone correction section 229. FIG. 24(a) is a graph illustrating an exemplary gamma correction curve used when gamma correction suitable for a display characteristic of a display device is carried out. FIG. 24(b) is a graph illustrating an exemplary gamma correction curve used when gamma correction for enhancing a contrast between a text and a background is carried out. In a case where the output tone correction section 229 carries out gamma correction suitable for the image to be printed out by the image output apparatus 203, the gamma correction indicated by a solid line of FIG. 24(b), which gamma correction is different from the gamma correction (indicated by a dotted line) suitable for the display characteristic of the display device, is carried out so that the text is printed out clearly onto the paper sheet etc.

Meanwhile, the segmentation class signal outputted from the segmentation section 231 is supplied to the black generation and under color removal section 227, the spatial filter section 228, and the halftone generation section 230. The above sections each selectively carry out processes suitable for each region.

The following description discusses an image sending operation (see FIG. 21) carried out in the image forming apparatus 200. Here, the image input apparatus 202, the A/D conversion section 221, the shading correction section 222, the input processing section 223, and the segmentation section 231 carry out the same processes as those in the above printing operation which is carried out in the copy mode.

The color correction section 226 converts the image data supplied from the document correction section 225 into R'G'B' image data (e.g., sRGB data), which is suitable for a display characteristic of a commonly used display device.

The spatial filter section 228 processes the inputted image data so that the image data is subjected to a spatial filter process (an edge enhancement process and a smoothing process) by use of a digital filter. The spatial filter process is carried out according to the segmentation class signal supplied from the segmentation section 231. The output tone correction section 229 corrects the gamma characteristics of the image data in such a way that (i) a gamma characteristic of a character region is corrected according to the gamma correction curve of FIG. 24(b) and (ii) a gamma characteristic of a region other than the character region is corrected according to the gamma correction curve of FIG. 24(a).

It should be noted that the image data is subjected to no process in the black generation and under color removal section 227 and the halftone generation section 230. That is, the image data goes to a subsequent block through the above sections without being subjected to any process. Therefore, outputted from the output tone correction section 229 is the R'G'B' image data.

Meanwhile, the character recognition section 233 recognizes a character of the image data of each portion which has been processed in the second document detection section 232. The image data here encompasses image data of a portion whose orientation has been corrected by the second document detection section 232. Then, the drawing command generation section 234 generates an instruction of laying out a transparent text on the image data including the portions.

The R'G'B' image data supplied from the output tone correction section 229 and the recognition data supplied from the drawing command generation section 234 are converted by the format process section 235 into an image file such as a PDF file. The image file has, inserted therein by the drawing command generation section 234, the transparent text indicative of the result of the character recognition. The image file thus converted is attached to an e-mail by a mail processing section (a job device, not illustrated), which e-mail is to be transmitted to a destination over the network.

The following description discusses how a preview display is carried out in the image forming apparatus 200 (see FIG. 20). Here, the segmentation section 231, the second document detection section 232, and the character recognition section 233 carry out the same processes as those of the image processing apparatus 1 of FIG. 1. The second document detection section 232 functions as the division section 11, the orientation determining section 12, and the display control section 14 of FIG. 1. The division section 11 separates the image data into portions according to the segmentation class signal supplied from the segmentation section 231. The image display apparatus 205 functions as the display apparatus of FIG. 1.

Embodiment 3

Figure 25:
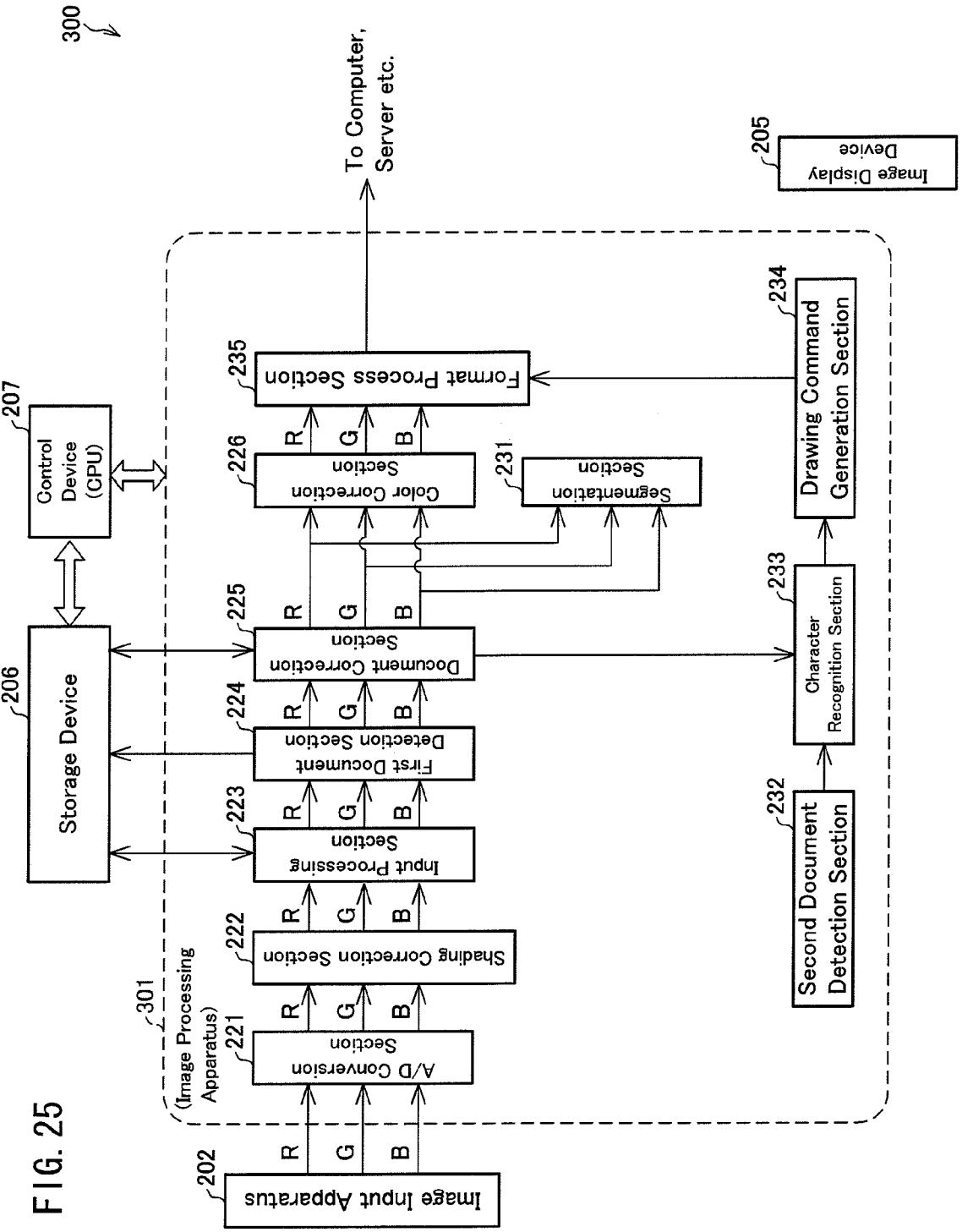
FIG. 25 is a block diagram showing a configuration of an image reading apparatus in accordance with an embodiment of the present invention.

The following explains another embodiment of the present invention with reference to the drawings. The present embodiment relates to an example in which the image processing apparatus 1 is applied to an image reading apparatus (scanner). FIG. 25 is a block diagram showing a configuration of an image reading apparatus 300.

The image reading apparatus 300 includes an image input apparatus 202 and an image processing apparatus 301. The image processing apparatus 301 includes an A/D (analog/digital) conversion section 221, a shading correction section 222, an input processing section 223, a first document detection section 224, a document correction section 225, a color correction section 226, a second document detection section 232, a character recognition section 233, a drawing command generation section 234, and a format process section 235. Processes carried out by the individual sections of the image processing apparatus 301 are the same as those in the case of image transmission carried out in the image forming apparatus 200.

Image data processed in the image processing apparatus 301, such as a PDF file, is outputted to a computer, a hard disc, a network etc. The processes in the image processing apparatus 301 is the same as those in the image processing apparatus 1 in that a preview-display of a portion whose reliability of an orientation is low (target portion) is performed in the image display apparatus 205 and that when a user designates the orientation from one of the preview-displayed designation regions 32, the designated orientation is regarded as the orientation of the target portion.

The present invention may be a computer-readable storage medium for storing program codes (such as executable program, intermediate code program, and source program) of the image processing method for determining the orientation of a document and rotating the document so as to display the document.

Consequently, it is possible to provide a movable storage medium for storing a program of the image processing method for determining the orientation of a document and rotating the document so as to display the document.

In the embodiments of the present invention, the storage medium may be a memory (not shown) used in processing by a microcomputer, e.g. ROMs which themselves serve as program media. Alternatively, the storage medium may be a program reading device which is provided as an external storage device (not shown) and which receives insertion of a storage medium so as to read a program stored therein.

In either case, the stored program codes may be executed by a microprocessor accessing the storage medium. Alternatively, in either case, the program codes may be read from the storage medium and the read program codes may be downloaded to a program storage area (not shown) in the microcomputer so as to execute the program codes. A program for the download is stored in a main body device in advance.

The storage medium is removable from a main body device provided that the storage medium can non-volatilely retain program codes. The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM (Erasable Programmable Read Only Memory), EEPROM (Electrically Erasable Programmable Read Only Memory), and flash ROM.

A system of the present embodiments is connectable with a communications network such as the Internet. Accordingly, the storage medium may be a medium which votatilely retain program codes so that the program codes are downloaded from the communications network. In a case of downloading program codes from the communications network, a program for the download may be stored in a main body device in advance or may be installed from other storage medium. Note that the present invention can be also realized by the program codes in the form of a computer data signal embedded in a carrier wave, which is the program that is electrically transmitted.

The storage medium is read by a program reading device included in a digital color image forming apparatus or a computer system, so that the image processing method is carried out.

The computer system includes an image input apparatus such as a flatbed scanner, a film scanner, and a digital camera, a computer which receives download of a predetermined program so as to carry out various processes such as the image processing method, an image display apparatus such as a CRT display and a liquid crystal display for displaying the result of processes by the computer, and a printer for outputting the result of processes by the computer onto a paper sheet. The computer system further includes communication means such as a network card and a modem for connecting with a server etc. via a network.

As described above, the image processing apparatus of the present invention may be arranged such that the display control section includes a display image generating section for generating the image of the target portion and the images of the designation regions and a display image output section for enlarging the image of the target portion and the images of the designation regions and outputting the enlarged image of the target portion and the enlarged images of the designation regions as the display image data.

With the arrangement, when urging a user to designate the orientation of the target portion, the enlarged image of the target portion and the enlarged images of the designation regions are displayed. This allows the user to easily recognize the target portion whose orientation is to be designated, and allows the user to easily designate the orientation from the designation regions.

The image processing apparatus may be arranged such that the display control section includes a rotation process section for rotating the display image data in accordance with the user' input to designate the orientation from one of the designation regions, and for outputting the rotated display image data as the display image data.

With the arrangement, the display image data to be displayed by the display device is rotated in accordance with the user' input to designate the orientation from one of the designation regions and redisplayed as display image data. This allows a user to instantly confirm whether the designation of the orientation of the target portion is appropriate or not. Further, in a case where the display image output section downsamples display image data, the rotation process section rotates the downsampled display image data (preview image data). This allows reducing a load on the process.

The image processing apparatus of the present invention may be arranged such that the character recognition section recognizes characters of the non-target portion after rotating the non-target portion in accordance with the orientation set by the orientation determining section, and recognizes characters of the target portion after rotating the target portion in accordance with the user's input to designate the orientation from one of the designation regions.

With the arrangement, when the character recognition section recognizes characters by referring to dictionary data, the character recognition section rotates the non-target portion and the target portion, instead of the dictionary data with a large data size. This allows reducing a load in character recognition and shortening a process time.

The image processing apparatus of the present invention may be arranged such that the display control section positions the designation regions at an upper side, a lower side, a left side, and a right side of the target portion, respectively, and designs the designation regions to have different sizes and/or different colors in accordance with differences between reliabilities of upper-, lower-, left-, and right-directions which are calculated by the orientation determining section.

With the arrangement, the designation regions positioned at four sides (in four directions) of the target portion are displayed in such a manner as to have different sizes and/or different colors. Consequently, when a user designates the orientation of the target portion from the designation regions, the user can easily designate the orientation of from the designation regions by referring to the difference in display state between the designation regions.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

REFERENCE SIGNS LIST

1: image processing apparatus
2: display device
11: division section
12: orientation determining section
13: character recognition section
14: display control section
21: preview-necessity determining section
22: preview-image generating section (display image generating section)
23: preview-image output section (display image output section)
24: rotation process section
31: selection region
32: designation region
33: preview-image
41: first portion
41a: square frame
42: second portion
42a: square frame
43: third portion
43a: square frame
51: portion
200: image forming apparatus
201: image processing apparatus
202: image input apparatus
203: image output apparatus (printing apparatus)
205: image display device
224: first document detection section
225: document correction section
231: segmentation section
232: second document detection section
233: character recognition section
300: image reading apparatus
301: image processing apparatus

The invention claimed is:

1. An image processing apparatus, comprising at least a processor that includes:
   a division section for dividing input image data into a plurality of portions;
   an orientation determining section for calculating reliabilities of upper-, lower-, left-, and right-directions of image data of each of the plurality of portions when the upper-, lower-, left-, and right-directions are regarded as orientations, and setting an orientation with the highest reliability out of the calculated reliabilities as an orientation of said each of the plurality of portions;
   a display control section for, when the plurality of portions whose orientations are set by the orientation determining section include a target portion whose reliability of an orientation is less than a predetermined value and a non-target portion whose reliability of an orientation is not less than the predetermined value, generating display image data used when a display device displays at least an image of the target portion and images of designation regions by one of which a user's input to designate the orientation of the target portion is entered; and a character recognition section for recognizing characters of the plurality of portions in such a manner that the orientation of the target portion is an orientation designated from one of the designation regions and the orientation of the non-target portion is an orientation set by the orientation determining section.

2. The image processing apparatus as set forth in claim 1, wherein the display control section includes a display image generating section for generating the image of the target portion and the images of the designation regions and a display image output section for enlarging the image of the target portion and the images of the designation regions and outputting the enlarged image of the target portion and the enlarged images of the designation regions as the display image data.

3. The image processing apparatus as set forth in claim 2, wherein the display control section includes a rotation process section for rotating the display image data in accordance with the user' input to designate the orientation from one of the designation regions, and for outputting the rotated display image data as the display image data.

4. The image processing apparatus as set forth in claim 1, wherein the character recognition section recognizes characters of the non-target portion after rotating the non-target portion in accordance with the orientation set by the orientation determining section, and recognizes characters of the target portion after rotating the target portion in accordance with the user's input to designate the orientation from one of the designation regions.

5. The image processing apparatus as set forth in claim 1, wherein the display control section positions the designation regions at an upper side, a lower side, a left side, and a right side of the target portion, respectively, and designs the designation regions to have different sizes and/or different colors in accordance with differences between reliabilities of upper-, lower-, left-, and right-directions which are calculated by the orientation determining section.

6. The image processing apparatus as set forth in claim 5, wherein the display control section designs the designation regions to have different sizes in accordance with differences between reliabilities of upper-, lower-, left-, and right-directions which are calculated by the orientation determining section, so that the size of the designation region is larger as the designation region corresponds to a direction with higher reliability as the orientation.

7. The image processing apparatus as set forth in claim 5, wherein the display control section designs the designation regions to have different colors in accordance with differences between reliabilities of upper-, lower-, left-, and right-directions which are calculated by the orientation determining section, so that the color of the designation region is deeper as the designation region corresponds to a direction with higher reliability as the orientation.

8. An image forming apparatus, comprising:
the image processing apparatus as set forth in claim 1;
a display device for displaying the display image data; and
a printing apparatus for printing image data onto a paper sheet.

9. The image forming apparatus as set forth in claim 8, wherein
the display device is a touch-panel display device, and
the display control section accepts, as the user's input, a user's touching operation on a screen of the display device.

10. An image processing method, comprising the steps of:
(i) dividing input image data into a plurality of portions;
(ii) calculating reliabilities of upper-, lower-, left-, and right-directions of image data of each of the plurality of portions when the upper-, lower-, left-, and right-directions are regarded as orientations, and setting an orientation with the highest reliability out of the calculated reliabilities as an orientation of said each of the plurality of portions;
(iii) when the plurality of portions whose orientations are set in the step (ii) include a target portion whose reliability of an orientation is less than a predetermined value and a non-target portion whose reliability of an orientation is not less than the predetermined value, generating display image data used when a display device displays at least an image of the target portion and images of designation regions by one of which a user's input to designate the orientation of the target portion is entered; and
(iv) recognizing characters of the plurality of portions in such a manner that the orientation of the target portion is an orientation designated from one of the designation regions and the orientation of the non-target portion is an orientation set in the step (ii).

11. A non-transitory computer-readable storage medium with an executable program stored thereon, wherein the program instructs a processor to perform the following steps:
(i) dividing input image data into a plurality of portions;
(ii) calculating reliabilities of upper-, lower-, left-, and right-directions of image data of each of the plurality of portions when the upper-, lower-, left-, and right-direction are regarded as orientations, and setting an orientation with the highest reliability out of the calculated reliabilities as an orientation of said each of the plurality of portions;
(iii) when the plurality of portions whose orientations are set in the step (ii) include a target portion whose reliability of an orientation is less than a predetermined value and a non-target portion whose reliability of an orientation is not less than the predetermined value, generating display image data used when a display device displays at least an image of the target portion and images of designation regions by one of which a user's input to designate the orientation of the target portion is entered; and
(iv) recognizing characters of the plurality of portions in such a manner that the orientation of the target portion is an orientation designated from one of the designation regions and the orientation of the non-target portion is an orientation set in the step (ii).

* * * * *